United States Patent
Tanaka et al.

(10) Patent No.: US 6,900,791 B2
(45) Date of Patent: May 31, 2005

(54) COORDINATE INPUT APPARATUS AND CONTROL METHOD AND PROGRAM THEREFOR

(75) Inventors: Atsushi Tanaka, Kanagawa (JP); Katsuyuki Kobayashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 505 days.

(21) Appl. No.: 09/900,065

(22) Filed: Jul. 6, 2001

(65) Prior Publication Data

US 2002/0042699 A1 Apr. 11, 2002

(30) Foreign Application Priority Data

| Jul. 7, 2000 | (JP) | 2000-206795 |
| Aug. 7, 2000 | (JP) | 2000-239107 |
| Aug. 22, 2000 | (JP) | 2000-250851 |
| May 23, 2001 | (JP) | 2001-154284 |

(51) Int. Cl.$^7$ .............. G09G 5/00; G09G 5/08
(52) U.S. Cl. ............ 345/156; 345/157; 345/179; 178/19.01; 178/19.05
(58) Field of Search .............. 345/157, 156, 345/179; 178/19.01, 19.05

(56) References Cited

U.S. PATENT DOCUMENTS 5,341,155 A * 8/1994 Elrod et al. ............. 345/179
5,499,098 A * 3/1996 Ogawa .................... 356/621

FOREIGN PATENT DOCUMENTS

| JP | 6-274266 | 9/1994 |
| JP | 7-76902 | 10/1995 |
| JP | 11-219253 | 8/1999 |

* cited by examiner

Primary Examiner—Jimmy H. Nguyen
(74) Attorney, Agent, or Firm—Morgan & Finnegan, LLP

(57) ABSTRACT

A light irradiated on a coordinate input screen from a pointing device is detected, and pieces of output information obtained as detection results for light at least at three known positions including first to third positions are stored. The coordinate values of the light formed on the coordinate input screen are calculated using at least two of the stored pieces of output information at the first to third positions.

13 Claims, 31 Drawing Sheets (2 of 31 Drawing Sheet(s) Filed in Color)

FIG. 3

| SWITCH A | SWITCH B | SWITCH C | SWITCH D | LIGHT EMISSION | PEN DOWN | PEN BUTTON |
|---|---|---|---|---|---|---|
| × | × | — | — | OFF | OFF | OFF |
| ○ | × | × | × | ON | OFF | OFF |
| ○ | × | ○ | × | ON | ON | OFF |
| ○ | × | × | ○ | ON | OFF | ON |
| ○ | × | ○ | ○ | ON | ON | ON |
| ○ | ○ | — | — | ON | ON | ON |
| × | ○ | — | — | ON | ON | OFF |

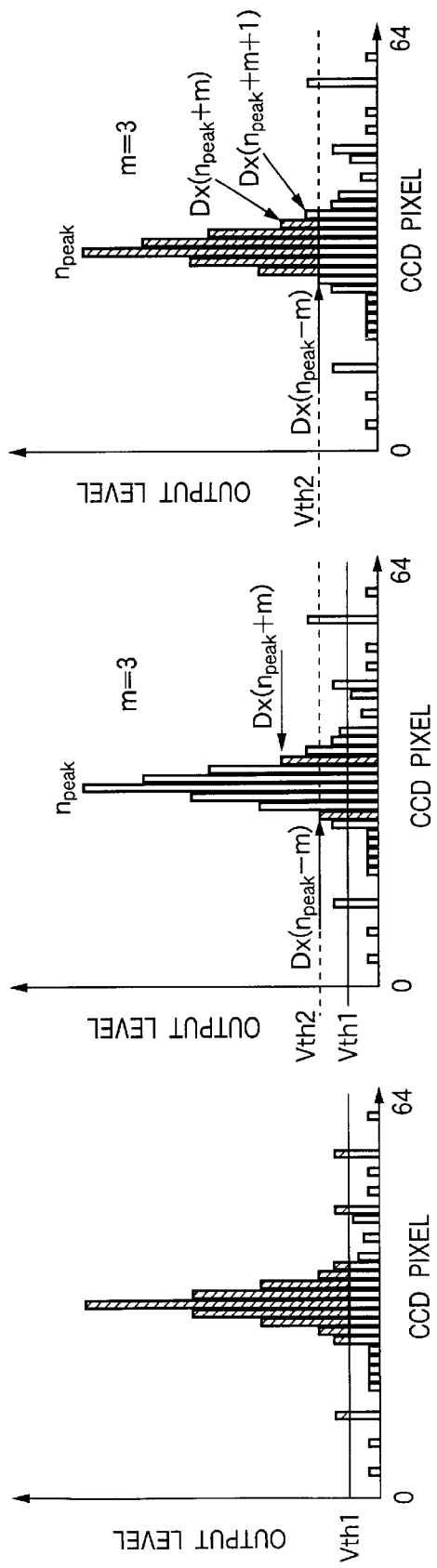

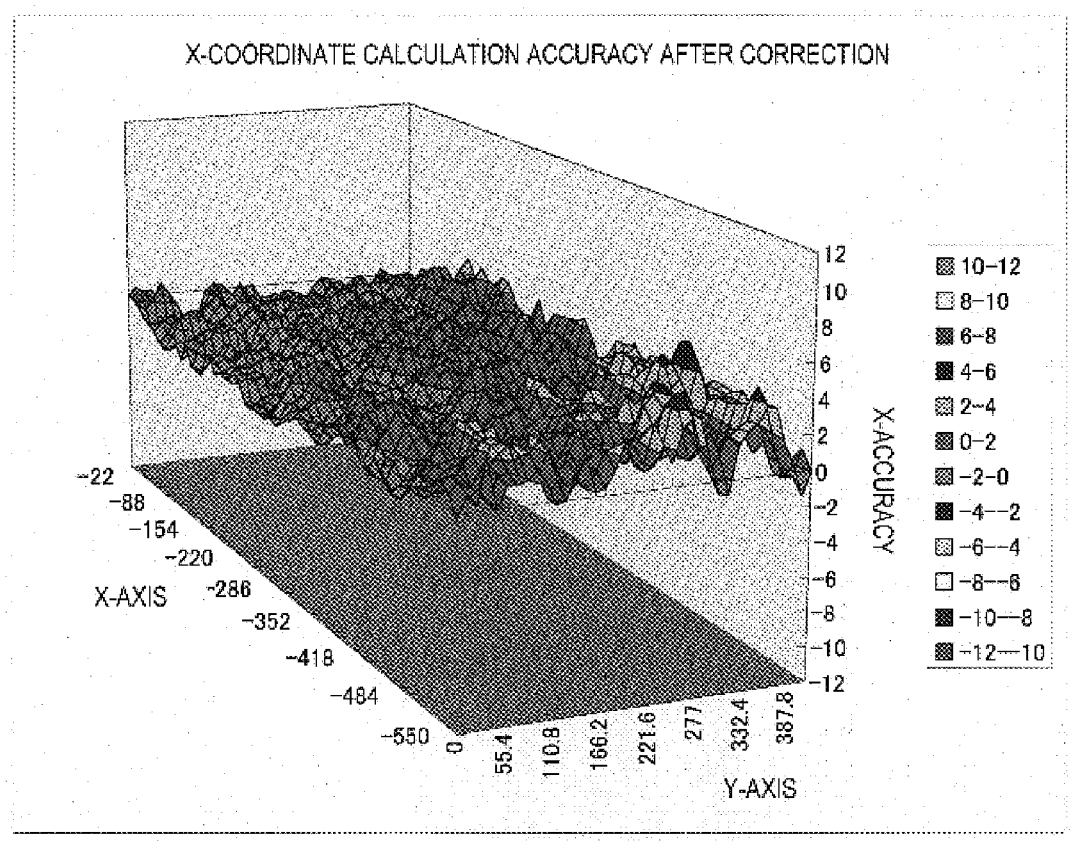
F I G. 16

COORDINATE INPUT APPARATUS AND CONTROL METHOD AND PROGRAM THEREFOR

FIELD OF THE INVENTION

The present invention relates to a coordinate input apparatus for irradiating a coordinate input window with light from a pointing device and generating coordinates corresponding to the light, and a control method and program therefor.

BACKGROUND OF THE INVENTION

Since recent wide-screen displays have improved brightness, they can be satisfactorily used in a brightly illuminated environment, and a demand for such displays is growing. Coordinate input apparatuses are increasingly required to be resistant against disturbance light for the purpose of use in combination with such wide-screen displays.

Recently, many devices use infrared light as a radio communication means. Since disturbance light tends to increase for both infrared and visible light, the resistance against disturbance light is one of important characteristics of an apparatus.

However, in an apparatus using a conventional CCD sensor disclosed in Japanese Patent Publication No. 7-76902 or Japanese Patent Laid-Open No. 6-274266, disturbance light can be suppressed only by an optical filter.

To the contrary, an apparatus using a PSD disclosed in Japanese Patent Application No. 2,503,182 exhibits strong resistance against disturbance light in cooperation with an optical filter because the apparatus can suppress the influence of disturbance light by frequency-modulating the light intensity and synchronously detecting the modulated wave.

A wide-screen display is increasing in resolution as well as in brightness. Hence, the resolving power of a coordinate input apparatus must also be improved, though the apparatus using a PSD resistant against disturbance light has a problem in this point.

That is, since the dynamic range of the sensor output voltage directly corresponds to the input range, an S/N ratio of at least 60 dB is required when the entire screen is segmented into, e.g., 1,000 coordinates. In addition, as described in Japanese Patent Application No. 2,503,182, since digital correction for a linear error is indispensable, a highly accurate analog circuit, a multi-bit A/D converter, and an arithmetic circuit are necessary. Furthermore, since the S/N ratio of a sensor output signal depends on the light amount and the sharpness of the light spot, suppressing disturbance light is insufficient, and a bright and accurate optical system is also required. These make the apparatus itself very expensive and bulky.

As a method of increasing the resolving power using a CCD, simultaneously using a plurality of video cameras is disclosed in Japanese Patent Publication No. 7-76902, though this method makes the apparatus bulky and expensive. An apparatus using a video camera with a lot of pixels becomes further bulky and expensive than that using a plurality of cameras. To achieve a resolving power more than the number of pixels, high-speed processing of an enormous quantity of image data is necessary. For real-time operation, the apparatus again becomes very bulky and expensive.

In Japanese Patent Laid-Open No. 6-274266, a high resolving power is obtained by a special optical mask and signal processing. If disturbance light is small, and a satisfactory S/N ratio can be ensured, the resolving power can be increased. In fact, since a linear sensor forms a linear image which cannot be separated from disturbance light in a plane, unlike an area sensor for forming a point image, and is therefore readily affected by disturbance light, the apparatus can be used only in a special environment with little disturbance light.

A scheme aiming at suppressing the influence of disturbance light and providing an inexpensive coordinate input apparatus is disclosed in Japanese Patent Laid-Open No. 11-219253, which blinks a light-emitting element incorporated in a writing tool and detects the difference signal between the signal in the ON state and that in the OFF state with a linear sensor to suppress the influence of disturbance light, and the position of the writing tool is detected on the basis of which pixel in the linear sensor receives the difference signal.

However, the coordinate input apparatus disclosed in Japanese Patent Laid-Open No. 11-219253 has the following problem. FIG. 7 shows the layout relationship between two linear sensors 20X and 20Y, the layout relationship between cylindrical lenses 90X and 90Y that serve as an imaging optical system, and a state wherein a light spot 5 on a coordinate input surface 10 forms linear images (images 91X and 91Y in FIG. 7) on photosensitive portions 21X and 21Y of the linear sensors 20X and 20Y through the cylindrical lenses 90X and 90Y.

When the two linear sensors 20X and 20Y are accurately laid out perpendicularly to each other, each linear sensor can obtain a sensor output signal with a maximum optical output on a pixel that reflects the X- or Y-coordinate of the light spot 5. When the images 91X and 91Y of the light spot 5 are appropriately blurred by focus adjustment, the image width becomes several times larger than that of a pixel of the linear sensors 20X and 20Y, and optical outputs are obtained from a plurality of pixels. By obtaining the barycentric position of the plurality of pixel signals, output pixel numbers $\alpha_X$ and $\alpha_Y$ of the linear sensors 20X and 20Y corresponding to the light spot 5 can be calculated.

A conventional technique of calculating coordinate values using the output pixel numbers $\alpha_X$ and $\alpha_Y$ will be described.

To calculate coordinates from the barycenter $(\alpha_X, \alpha_Y)$ of output data, the output pixel numbers $\alpha_X$ and $\alpha_Y$ of the linear sensors 20X and 20Y corresponding to the light spot 5 at a predetermined known position must be stored. That is, when the output pixel numbers of the linear sensors 20X and 20Y corresponding to the light spot 5 at the first known point with coordinate values $(X_C, Y_C)$ and at the second known point with coordinate values $(X_1, Y_1)$ are defined as $(\alpha_{X0}, \alpha_{Y0})$ and $(\alpha_{X1}, \alpha_{Y1})$ respectively, the coordinate values $(X, Y)$ of the light spot 5 at an arbitrary position to be detected are given by $$X = (\alpha_X - \alpha_{X0})(X_1 - X_0)/(\alpha_{X1} - \alpha_{X0}) + X_0 \quad (1)$$

$$Y = (\alpha_Y - \alpha_{Y0})(Y_1 - Y_0)/(\alpha_{Y1} - \alpha_{Y0}) + Y_0 \quad (2)$$

FIG. 17 is a graph showing the coordinate calculation accuracy of a coordinate input apparatus, which is obtained by the above calculations. Referring to FIG. 17, the X- and Y-axes represent the coordinate values of the coordinate input surface. The coordinate values (0,0) correspond to the central position of the coordinate input effective area. When optical elements such as lenses are laid out geometrically symmetrically with respect to the origin, the optical characteristics in the respective quadrants are symmetrical with respect to the origin. FIG. 17 shows a result obtained by checking the coordinate calculation accuracy of the coordinate input apparatus in a given quadrant.

FIGS. 14A and 14B are views showing the optical layout only in the X-axis direction (X-axis sensor 20X and cylindrical lens 90X). The X- and Y-axes in FIG. 17 are the coordinate value axes of the coordinate input surface and correspond to the X- and Y-axes in FIG. 14A. The Z-axis in FIG. 17 represents the difference between the coordinate values to be actually calculated and the resultant coordinate values of the coordinate input apparatus, i.e., the coordinate calculation accuracy of the coordinate input apparatus.

This analysis result is obtained by setting the known points $(X_0,Y_0)$ and $(X_1,Y_1)$ in equations (1) and (2), i.e., the first known point $(X_0,Y_0)$ at the origin (the central position of the coordinate input effective area) and the second known point $(X_1,Y_1)$ at the central position of the coordinate input effective area in that quadrant. According to FIG. 17, the accuracy gradually degrades in a region where the X-axis value becomes large and the Y-axis value also becomes large (the accuracy of this coordinate input apparatus is about 11 mm, as is apparent from the graph). Although FIG. 17 shows the coordinate calculation accuracy in the X-direction, that in the Y-direction also indicates the same result as described above.

That is, the coordinate calculation accuracy in the prior art degrades in the region where the X-axis value becomes large and the Y-axis value also becomes large. Analysis by numerical simulation reveals that the phenomenon occurs due to use of a cylindrical lens. To solve this distortion, a cylindrical lens must have, e.g., an aspherical surface not only in a direction perpendicular to the axis of the cylindrical lens but also along a section in a direction parallel to the axis. Even when such a lens can be optically designed, a plastic lens mold is hard to prepare, and the lens becomes very expensive.

SUMMARY OF THE INVENTION

The present invention has been made in consideration of the above problems, and has as its object to provide an inexpensive coordinate input apparatus which has a high accuracy and resolving power and excellent operability, and a control method and program therefor.

According to the present invention, the foregoing object is attained by providing a coordinate input apparatus for irradiating a coordinate input screen with light from a pointing device, and generating coordinates corresponding to the light, comprising: detection means for detecting the light irradiated on the coordinate input screen from the pointing device; storage means for storing output information from the detection means by light at least at three known positions including first to third positions; and calculation means for calculating coordinate values of the light irradiated on the coordinate input screen using at least two of the pieces of output information at the first to third positions, which are stored in the storage means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The claim of this patent contains at least one drawing executed in color.

FIG. 3 is a table showing the operation modes of the pointing device according to the first embodiment;

FIGS. 13A to 13C are explanatory views related to coordinate calculation according to the first embodiment;

FIG. 16 is a graph showing the coordinate calculation accuracy distribution of the coordinate input apparatus according to the first embodiment;

DETAILED DESCRIPTION OF THE PREFERRED EMBODIMENTS

The embodiments of the present invention will be described below in detail with reference to the accompanying drawings.

The schematic arrangement of an optical coordinate input apparatus according to the present invention will be described first with reference to FIG. 1.

<First Embodiment>

Figure 1:
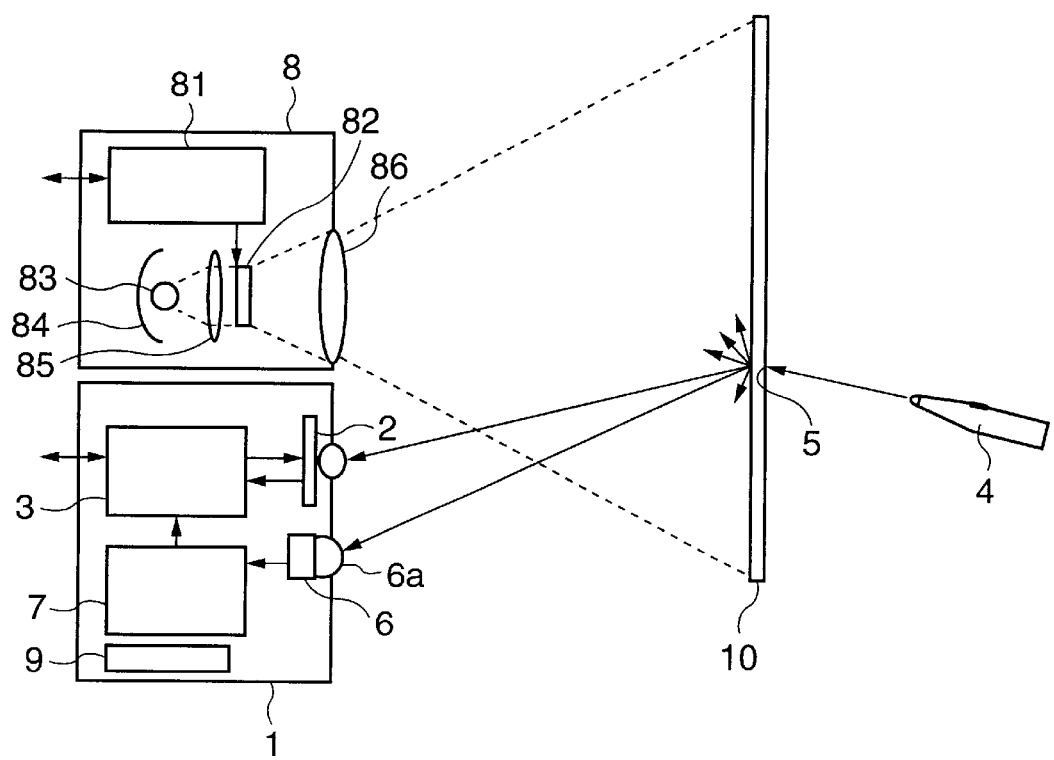
FIG. 1 is a view showing the schematic arrangement of a coordinate input apparatus according to the first embodiment.

FIG. 1 is a view showing the schematic arrangement of a coordinate input apparatus according to the first embodiment.

This coordinate input apparatus roughly comprises a pointing device 4 for forming a light spot 5 on a screen 10 as a coordinate input surface, and a coordinate detector 1 for detecting the coordinate values and the like of the light spot 5 on the screen 10. FIG. 1 also shows a projection display device 8 serving as an output device for displaying an image, coordinate values, and the like on the screen 10.

The coordinate detector 1 comprises a coordinate detection sensor section 2, a controller 3 for controlling the coordinate detection sensor section 2 and executing coordinate calculation, a light-receiving element 6, a signal processing section 7, and a nonvolatile memory 9 formed from, e.g., an EEPROM which stores various set values. The coordinate detector 1 detects the coordinate position of the light spot 5 on the screen 10 and a control signal corresponding to the state of each switch (to be described later) of the pointing device 4 and cause the controller 3 to send the information to an externally connected device (not shown).

The projection display device 8 comprises an image signal processing section 81 for receiving an image signal from a display signal source, i.e., an externally connected device such as a host computer (not shown), an illumination optical system including a liquid crystal panel 82, lamp 83, mirror 84, and condenser lens 85 that are controlled by the image signal processing section 81, and a projecting lens 86 for projecting the image on the liquid crystal panel 82 to the screen 10, and can display desired image information on the screen 10. The screen 10 has appropriate light diffusion properties to widen the observation range of a projected image. Hence, a light beam emitted from the pointing device 4 is also diffused at the position of the light spot 5 such that the light diffused at the position of the light spot 5 partially enters the coordinate detector 1 independently of the position on the screen or the direction of light beam.

With this arrangement, when character information or line drawing information is input on the screen 10 using the pointing device 4, and the information is displayed by the projection display device 8, the information can be input/output as if the pointing device and screen were "a pencil and paper". Additionally, input operation such as button operation or icon selection/determination can be freely executed.

<Detailed Description of Pointing Device 4>

Figure 2:
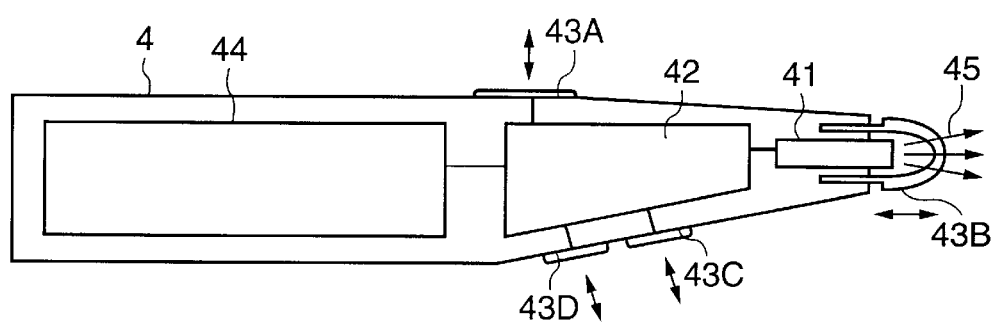
FIG. 2 is a view showing the detailed arrangement of a pointing device according to the first embodiment.

FIG. 2 is a view showing the detailed arrangement of the pointing device according to the first embodiment.

The pointing device 4 incorporates a light-emitting element 41 such as a semiconductor laser for emitting a light beam or an LED for emitting infrared light, a light emission control section 42 for driving and controlling the light emission, operation switches 43A to 43D, a power supply section 44 such as a battery, and a cap 46 formed from a transparent member that detachably covers the light-emitting element 41. The light emission control section 42 executes light emission control with control signals superposed in accordance with the states of the operation switches 43A to 43D by on/off-controlling light emission and using a modulation method (to be described later).

FIG. 3 is a table showing the operation modes of the pointing device according to the first embodiment.

Switches A to D correspond to the switches 43A to 43D in FIG. 2, respectively. Referring to FIG. 3, "light emission" corresponds to a light emission signal (coordinate signal), and "pen down" and "pen button" correspond to control signals.

The operator grips the pointing device 4 and directs its tip to the screen 10. Then, the switch 43A naturally comes into contact with the thumb. When the switch 43A is pressed, a light beam 45 is emitted. Then, the light spot 5 is formed on the screen 10, and output of a coordinate signal is started by predetermined processing. In this state, the pen down and pen button control signals are OFF (e.g., the state on the second row of FIG. 3). Hence, only presentation of the indicated position to the operator is done on the screen 10 in accordance with the cursor movement or highlight switching by a button.

When the switches 43C and 43D that naturally come into contact with the index and middle fingers are pressed, the pen down and pen button control signals are superposed on the light emission signal, as shown in FIG. 3. That is, when the switch 43C is pressed, a pen down state is set so that window control can be executed by starting inputting a character or line drawing or selecting and determining a button. When the switch 43D is pressed, a pen button state (e.g., the state on the fourth or fifth row in FIG. 3) is set such that the pointing device can cope with another function such as menu retrieval. The operator can smoothly operate the pointing device by quickly and accurately drawing characters or a graphic pattern or selecting a button or menu by one hand at an arbitrary position on the screen 10.

The switch 43B is arranged at the tip of the pointing device 4. The switch 43B operates when the pointing device 4 is pressed against the screen 10. When the operator grips the pointing device 4 and presses its tip against the screen 10, the pen down state (the state on the lowermost row of FIG. 3) is set. Hence, the operator can execute natural pen input operation without any other button operation.

The switch 43A also serves as a pen button. When the user presses the switch 43A without pressing it against the screen, only the cursor can be moved. Actually, input of characters or a graphic pattern can be done at much higher operability and accuracy by the pointing device that is in direct contact with the screen than by that separated from the screen.

In the first embodiment, even when the operator is separated from the screen or is immediately in front of the screen, he/she can execute natural and comfortable operation using the four switches and selectively use the mode in accordance with the situation. If the pointing device is exclusively used for direct input (if the pointing device is not used as a pointer), a diffused light source can be used in place of the light beam, and an LED that is less expensive and has a longer service life than a semiconductor laser can be used.

The light emission control section 42 is set to transmit an ID number unique to each pointing device together with control signals such that the pointing devices 4 of two types for proximity and remote operations can be used, two or more operators can simultaneously do the operation, or a plurality of pointing devices 4 having different attributes such as color and thickness can be used. The attributes such as the thickness and color of a line to be drawn are determined by software on the externally connected device side in correspondence with the transmitted ID number. Settings can be changed by buttons or menus on the screen 10. For this operation, a separate operation button or the like may be prepared on the pointing device 4 to transmit a change instruction signal. For these settings, the state may be held in the pointing device 4 or coordinate detector 1, and not the ID number but attribute information may be transmitted to the externally connected device.

Such an additional operation button can also be set to execute another function, e.g., to blink the display device, switch the signal source, or operate a recording device or the like. In addition, various useful signals may be transmitted by, e.g., preparing a pressure detection means in one or both of the switches 43A and 43B to detect the writing pressure and transmitting the writing pressure data together with the control signals.

When the switch 43A or 43B of the pointing device 4 is turned on, light emission starts. With the light emission signal, a leader field formed from a relatively long continuous pulse sequence and a subsequent header field formed from a code (e.g., a manufacturer ID) are output first. Then, a transmission data sequence containing the pen ID and control signals is output to sequentially output the pieces of information in accordance with a predetermined order and format (see a signal LSG in FIG. 5).

In the first embodiment, a modulation scheme is employed for the respective bits such that "1" bits have an interval twice that for "0" bits. As a data encoding scheme, various schemes can be used. However, as will be described later, for coordinate detection, the average light amount is preferably constant, for PLL, the clock component is preferably sufficiently large, and the degree of redundancy can be relatively high when the data amount to be transmitted is taken into consideration. From these viewpoints, in the first embodiment, an encoding scheme of assigning 6-bit data (64 data) to 108 codes each having a 10-bit length, in which "1"s and "0"s are equal in number, and the number of runs of "1" or "0" is 3 or less, is used. By employing this encoding scheme, a constant average power can be obtained, and a sufficiently large clock component is contained. Hence, a stable sync signal can easily be generated at the time of demodulation.

As described above, although each of the pen down and pen button control signals contains 2 bits, longer data such as an ID must also be transmitted. In the first embodiment, one block data is formed by defining the first two bits as a control signal, the second two bits as a content identification code (e.g., a writing pressure signal is "00" and an ID is "11"), and the third two bits as the parity of this data, which are followed by a 16-bit data and a 2-bit parity. When this data is encoded by the above-described scheme, a 40-bit signal is obtained. A 10-bit sync code is added to the start of the data. As this sync code, a special code having a pattern containing a run of four "0"s and a run of five "1"s, or an inverted pattern (the patterns are switched depending on whether the end of the immediately preceding block has "1" or "0") is used such that the code can easily be discriminated from the data word, the position can be reliably identified even in a data sequence, and the data can be reconstructed. Hence, one block data contains a 50-bit transmission signal which transmits the control signal and the 16-bit ID or writing pressure data or the like.

In the first embodiment, ⅛ of the first frequency 60 kHz, i.e., 7.5 kHz is defined as the second frequency. Since the above-described encoding scheme is employed, the average transmission bit rate is ⅔ of 7.5 kHz, i.e., 5 kHz. In addition, since one block contains 50 bits, 24 bit data per block is transmitted at 100 kHz. Hence, the effective bit rate excluding the parity is 2,000 bit/sec. As described above, although the degree of redundancy is high, preventing any detection error and facilitating the synchronization can be realized with a very simple arrangement. When both a phase lock signal for sensor control (to be described later) and sync code repetitive period check are used, follow-up is possible even when a short dropout occurs in the signal. Conversely, quick operation for pen up or double tap can be reliably discriminated depending on the presence/absence of the header signal.

<Detailed Description of Coordinate Detector 1>

Figure 4:
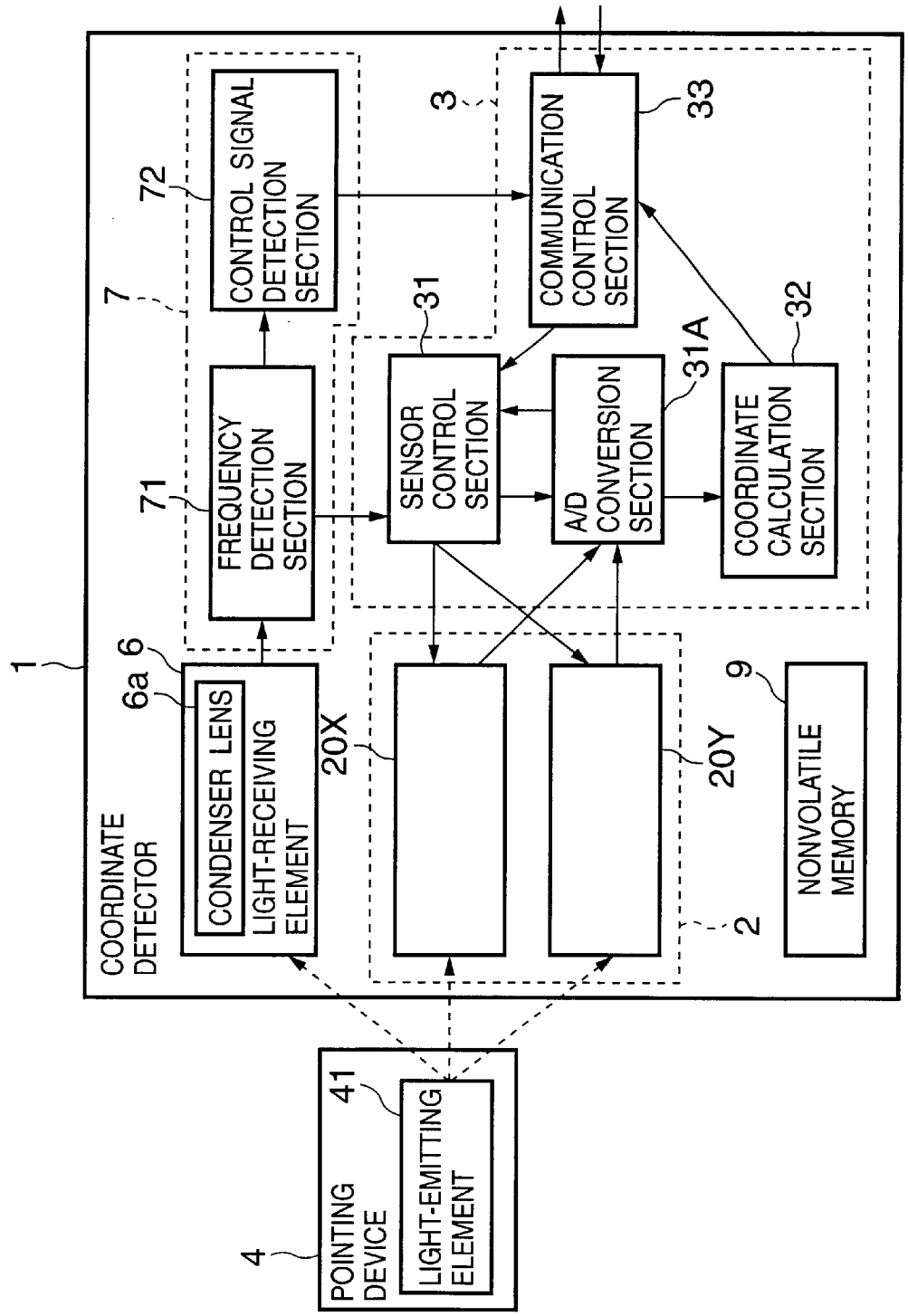
FIG. 4 is a block diagram showing the detailed arrangement of a coordinate detector according to the first embodiment.

FIG. 4 is a block diagram showing the detailed arrangement of the coordinate detector according to the first embodiment.

The coordinate detector 1 has the light-receiving element 6 for sensitively detecting the light amount by a condenser optical system, and two linear sensors 20X and 20Y for detecting the direction of arrival of light by an imaging optical system. The linear sensors 20X and 20Y receive diffused light from the light spot 5 formed on the screen 10 by the light beam from the light-emitting element 41 incorporated in the pointing device 4.

<Description of Operation of Condenser Optical System>

The light-receiving element 6 has a condenser lens 6a serving as a condenser optical system to detect the amount of light having a predetermined wavelength at a high sensitivity from the full range of the screen 10. The detection output is detected by a frequency detection section 71 and demodulated into a digital signal containing data such as a control signal (signal superposed by the light emission control section 42 of the pointing device 4) by a control signal detection section 72.

A timing chart of the control signal reconstruction operation will be described with reference to FIG. 5.

Figure 5:
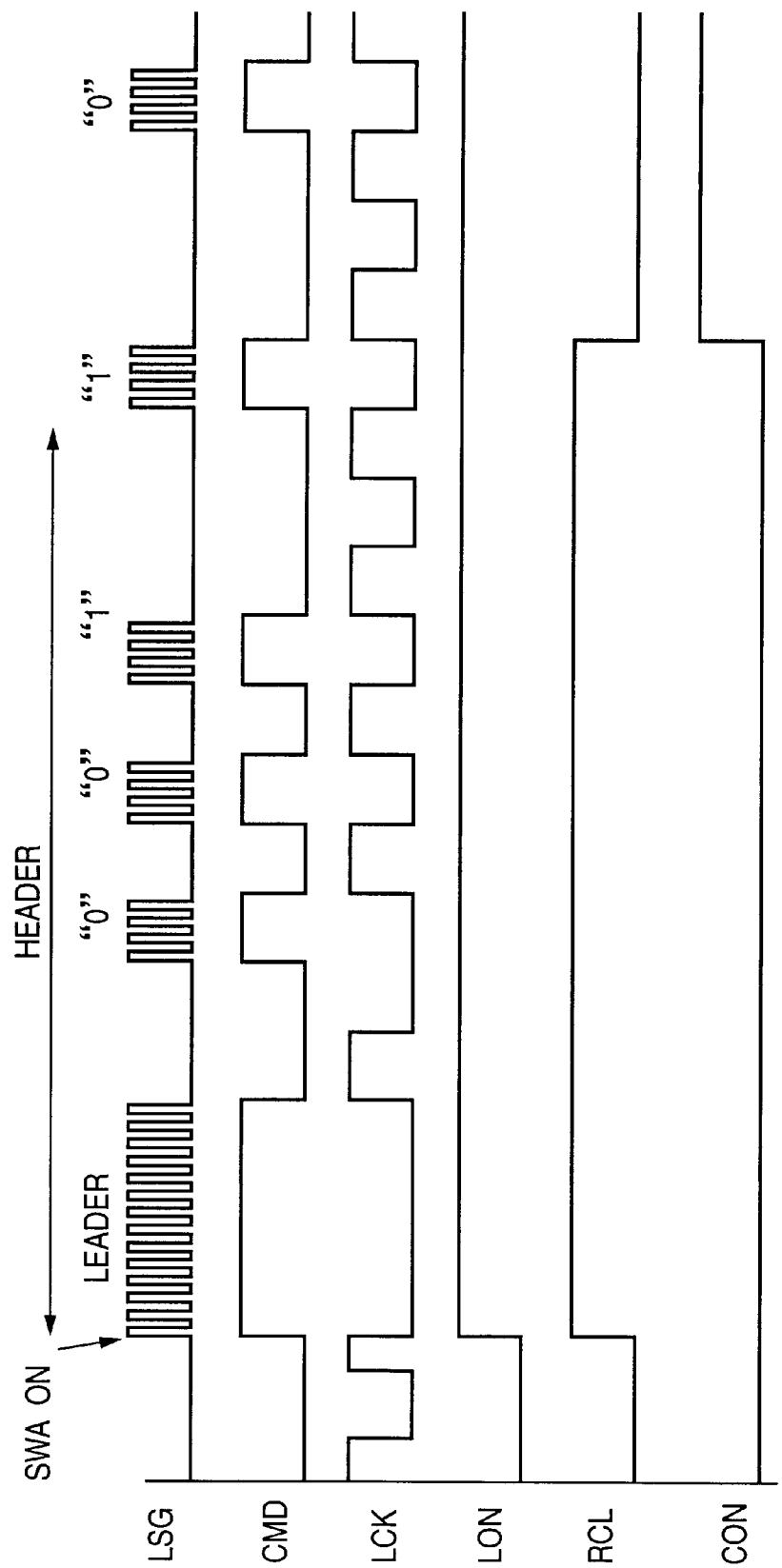
FIG. 5 is a timing chart showing control signal reconstruction operation of the first embodiment.

FIG. 5 is a timing chart showing the control signal reconstruction operation of the first embodiment.

A data signal formed from a bit sequence as described above is detected by the light-receiving element 6 as the optical output signal LSG and detected by the frequency detection section 71. The frequency detection section 71 is designed to tune the pulse period of the first frequency that is highest in the optical output signal LSG. Using an optical filter, too, the frequency detection section 71 demodulates a modulated signal CMD without suffering any influence of disturbance light. This detection method is a reliable radio communication scheme that is the same as in infrared remote controllers widely used in practice.

In the first embodiment, as the first frequency, 60 kHz in a higher band than for a general infrared remote controller is used, thereby preventing any operation error even when two devices are simultaneously used. However, the first frequency may have the same band as that of a general infrared remote controller. In this case, two devices are identified by IDs or the like, thereby preventing any operation error.

The modulated signal CMD detected by the frequency detection section 71 is decoded by the control signal detection section 72 as digital data, so the above-described pen down or pen button control signal is reconstructed. The reconstructed control signal is sent to a communication control section 33. The period of code modulation as the second frequency contained in the modulated signal CMD is detected by a sensor control section 31. The linear sensors 20X and 20Y are controlled on the basis of the signal. That is, the sensor control section 31 generates a signal LCK that is reset at the timing of the header field (HEADER) shown in FIG. 5 and then phase-locked to a trailing edge of the modulated signal CMD.

The generated signal LCK has a predetermined frequency synchronized with ON/OFF of light emission by the pointing device 4. A signal LON representing ON/OFF of light input and a sensor reset signal RCL activated by the signal LON are generated from the modulated signal CMD. The two linear sensors 20X and 20Y are reset during the high-level period of the sensor reset signal RCL, and synchronous integration operation (to be described later) is started at the trailing edge of the sensor reset signal RCL synchronized with a leading edge of the signal LCK.

When the control signal detection section 72 detects the header section and confirms that not input of noise or a signal from another device but input from the pointing device 4 has started, a signal representing this confirmation is transmitted from the communication control section 33 to the sensor control section 31, a signal CON representing the effective operation of the linear sensors 20X and 20Y is set at high level, and the operation of a coordinate calculation section 32 is started.

Figure 6:
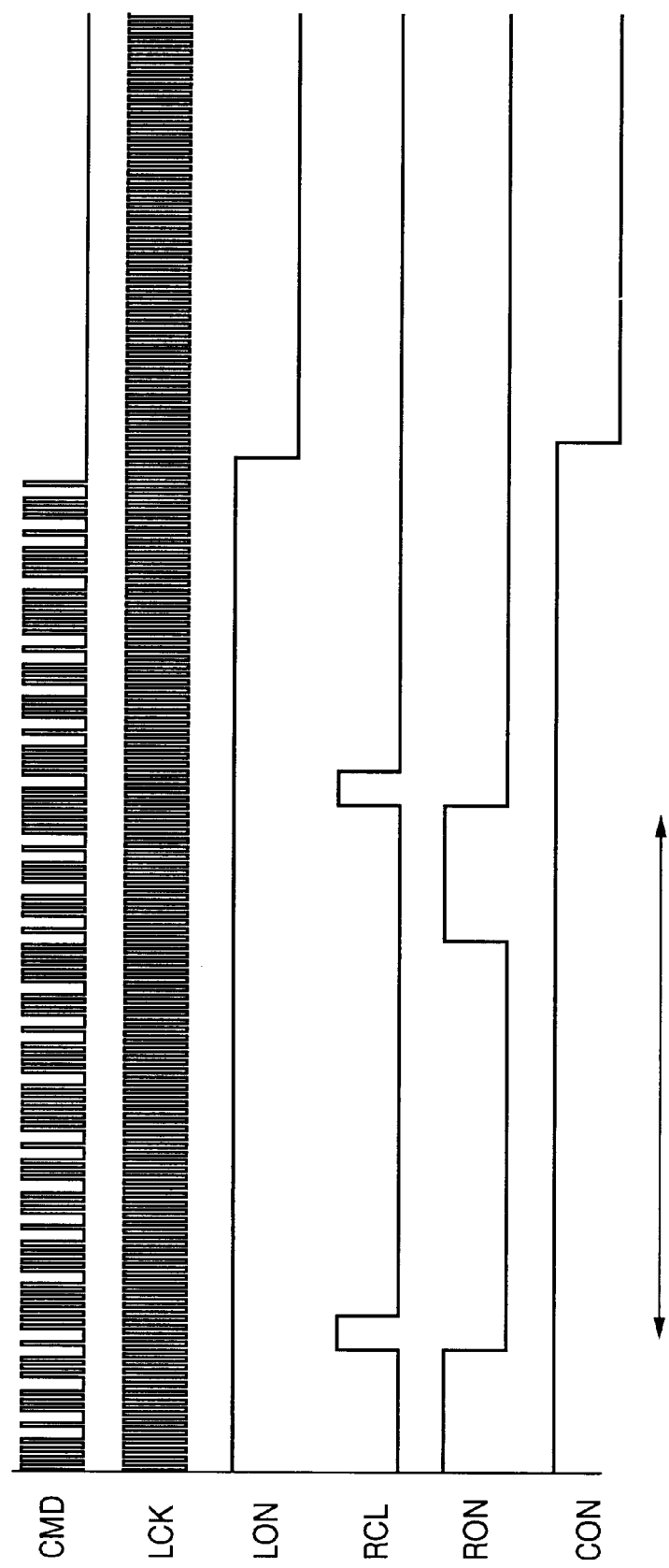
FIG. 6 is a timing chart showing signals handled in the first embodiment.

FIG. 6 is a timing chart when input of the optical output signal LSG stops, and the series of operations are ended. When the modulated signal CMD detected from the optical output signal LSG remains at low level for a predetermined time or more, the signal LON representing ON/OFF of light input goes low, the signal CON representing the effective operation of the sensors also goes low. As a result, coordinate output operation by the linear sensors 20X and 20Y is ended.

<Description of Operation of Imaging Optical System>

Figure 7:
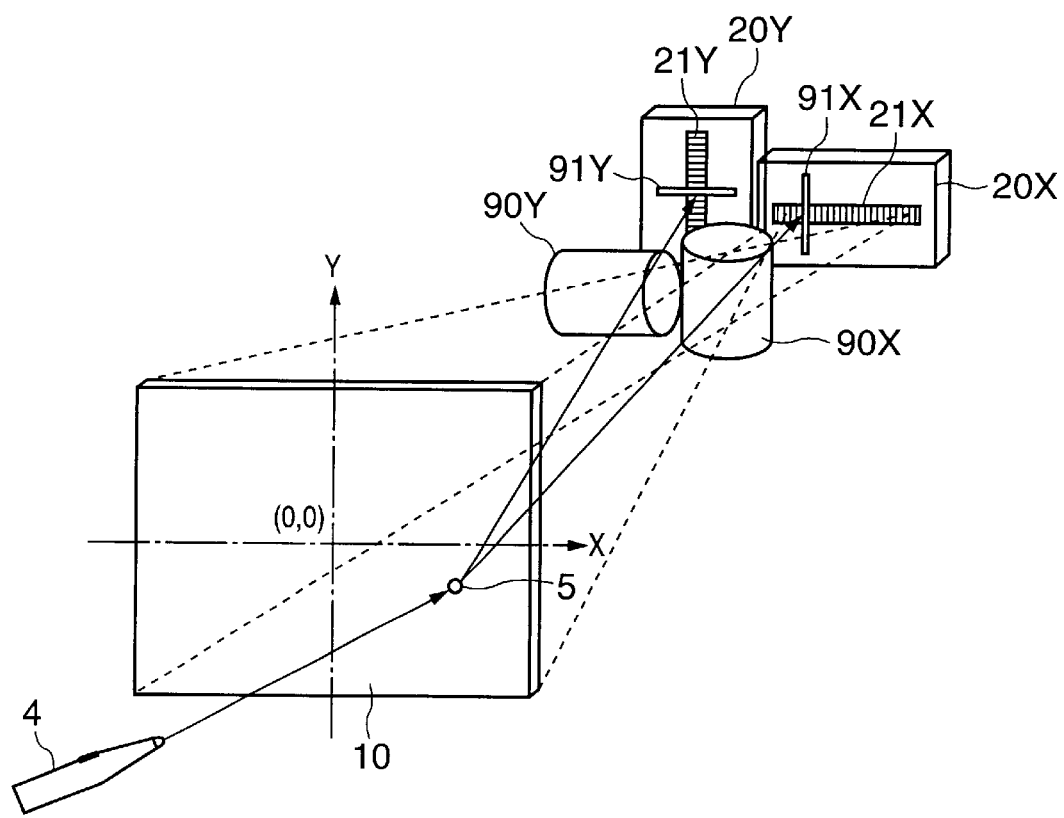
FIG. 7 is a view showing the layout relationship between linear sensors according to the first embodiment.

FIG. 7 is a view showing the layout relationship between the linear sensors 20X and 20Y.

FIG. 7 shows the layout relationship between the two linear sensors 20X and 20Y, and a state wherein the light spot 5 forms linear images 91X and 91Y on photosensitive portions 21X and 21Y of the linear sensors 20X and 20Y through cylindrical lenses 90X and 90Y serving as an imaging optical system. When the linear sensors 20X and 20Y are accurately laid out perpendicularly to each other, each linear sensor can obtain an output with a peak on a pixel that reflects the X- or Y-coordinate.

The linear sensors 20X and 20Y are controlled by the sensor control section 31. The output signals are converted into digital signals by an A/D conversion section 31A connected to the sensor control section 31 and sent to the coordinate calculation section 32. The coordinate calculation section 32 calculate the output coordinate values from the received digital signals and sends the calculation result to the external control unit (not shown) through the communication control section 33 together with data such as the control signal from the control signal detection section 72 using a predetermined communication method. To execute operation (e.g., user calibration value setting) different from the normal operation for adjustment, a mode switching signal is sent from the communication control section 33 to the sensor control section 31 and coordinate calculation section 32.

In this example, an image blur is intentionally generated by focus adjustment or using a diffusion film such that the image of the light spot 5 has a width several times larger than that of each pixel of the linear sensors 20X and 20Y. According to an experiment using a plastic cylindrical lens having a diameter of 1.5 mm, a linear CCD having 64 effective pixels with a pixel pitch of about 15 $\mu$m, and an infrared LED, when an image was formed at the highest sharpness, an image width of 15 $\mu$m or less was obtained for a view angle of about 40°. In this state, the interpixel division calculation result was distorted in a staircase pattern.

When the lens position was adjusted to obtain an image width of 30 to 60 $\mu$m, very smooth coordinate data were obtained. If the blur is too large, the peak level becomes low. Hence, an image width corresponding to several pixels is most preferable. As a characteristic feature of the present invention, a CCD with a small number of pixels and an optical system with an appropriate blur are used. With this combination, an inexpensive, high-speed coordinate input apparatus which has a high resolving power and accuracy and a small arithmetic data amount can be implemented using a small sensor and optical system.

The linear sensor 20X for detecting the X-coordinate and the linear sensor 20Y for detecting the Y-coordinate, that are laid out in an array, have the same structure. The detailed structure will be described with reference to FIG. 8.

Figure 8:
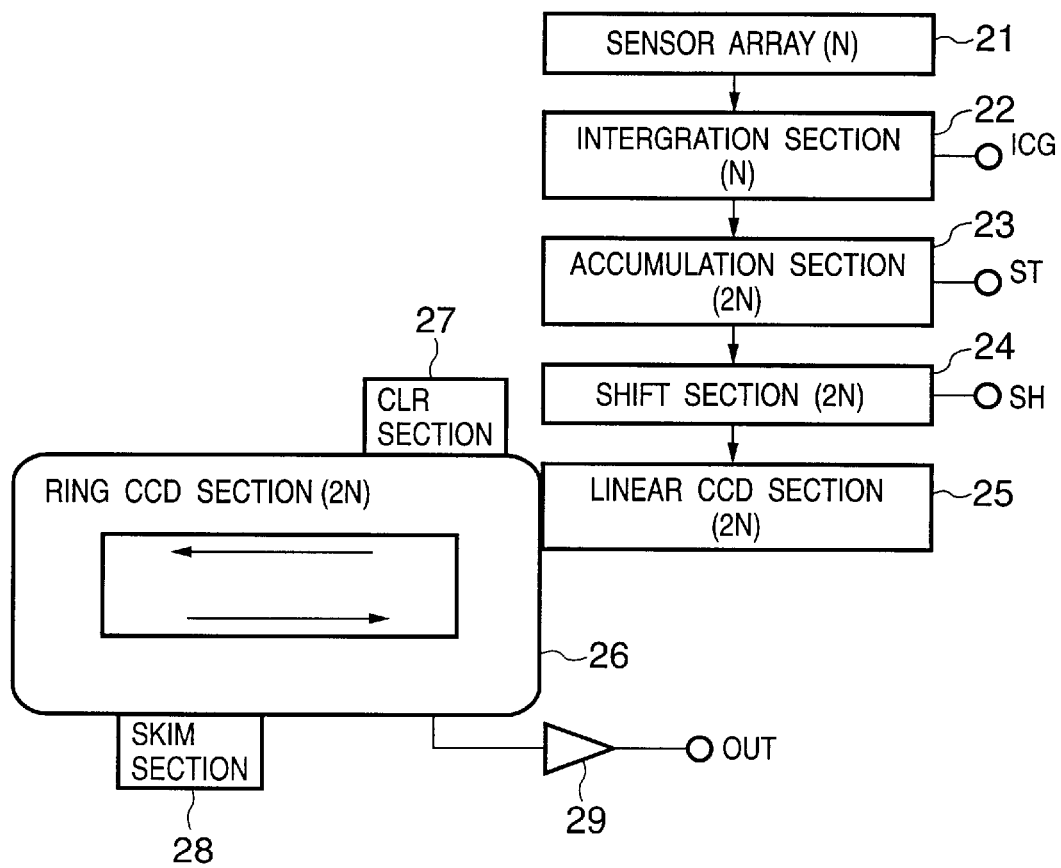
FIG. 8 is a view showing the detailed structure of the linear sensor according to the first embodiment.

FIG. 8 is a view showing the detailed structure of the linear sensor according to the first embodiment.

A sensor array 21 serving as a light-receiving section is formed from N pixels (for example, the sensor array has 64 photoelectric conversion elements that are linearly arrayed, and in this case, the sensor array is defined as a sensor with 64 pixels). Charges corresponding to the light-receiving amount are accumulated in an integration section 22. The integration section 22 has N elements. The integration section 22 can be reset by applying a voltage to a gate PCG and therefore can execute electronic shutter operation. The charges accumulated in the integration section 22 are transferred to an accumulation section 23 by applying a pulse voltage to an electrode ST. The accumulation section 23 has 2N elements which independently accumulate charges in correspondence with H (high level) and L (low level) of an IRCLK signal synchronized with the light emission timing of the pointing device 4. The charges independently accumulated in synchronism with blink of light are transferred to a linear CCD section 25 with 2N elements through a shift section 24 having 2N elements and arranged to simplify the transfer clock.

With this operation, the linear CCD section 25 adjacently stores charges corresponding to blink of light as sensor outputs from the N pixels. The charges stored in the linear CCD section 25 are sequentially transferred to a ring CCD section 26 having 2N elements. The ring CCD 26 is cleared by a CLR section 27 in accordance with a CLR signal and then sequentially accumulates charges from the linear CCD section 25.

The thus accumulated charges are read out by an amplifier 29. The amplifier 29 nondestructively outputs a voltage proportional to the accumulated charge amount. Actually, the amplifier 29 amplifies and outputs the difference between adjacent charge amounts, i.e., a value obtained by subtracting the charge amount in the OFF state of the light-emitting element 41 from the charge amount in the ON state.

Resultant output waveforms from the linear sensors 20X and 20Y will be described with reference to FIG. 9 (CCD pixel numbers are plotted along the abscissa, and the output levels are plotted along the ordinate).

Figure 9:
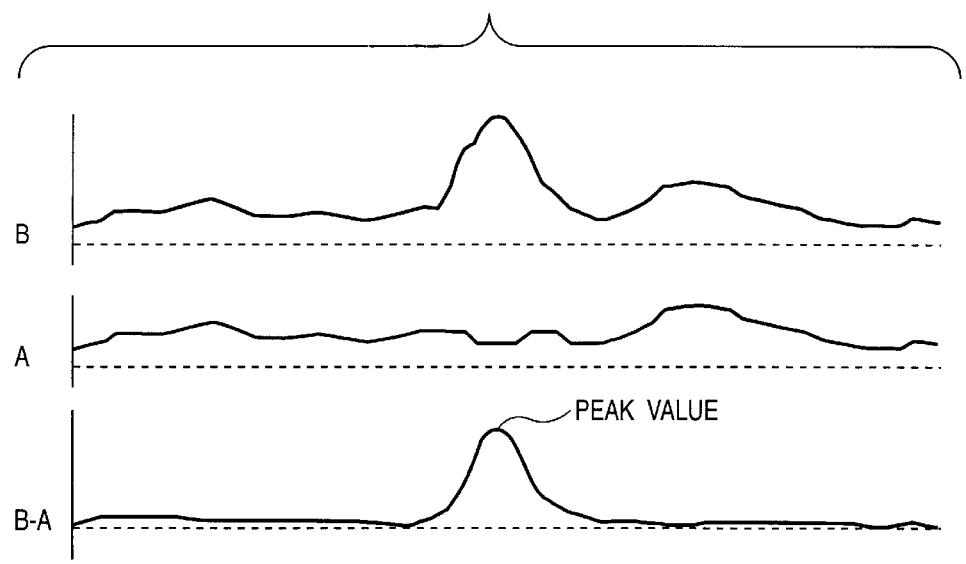
FIG. 9 is a waveform chart showing output waveforms of the linear sensors according to the first embodiment.

Referring to FIG. 9, a waveform B is obtained by reading only signals in the ON state of the light-emitting element 41. A waveform A is obtained when the light-emitting element 41 is OFF, i.e., when only disturbance light is input (as shown in FIG. 8, charges of pixels corresponding to the waveforms A and B are adjacently stored in the ring CCD section 26). The amplifier 29 nondestructively amplifies and outputs the difference value (waveform B−A) between the adjacent charge amounts. With this operation, a signal corresponding to only the image of light from the pointing device 4 can be obtained, and coordinates can be stably input without any influence of disturbance light (noise).

The maximum value of the waveform B−A shown in FIG. 9 is defined as a PEAK value. When the accumulation time during which the linear sensors 20X and 20Y function for light is increased, the PEAK value increases in accordance with the time. In other words, when the time corresponding to one period of the IRCLK signal is defined as a unit accumulation time, and the number n of times of accumulation is defined using that time as a unit, the PEAK value increases as the number n of times of accumulation increases. By detecting that the PEAK value reaches a predetermined magnitude TH1, an output waveform with a predetermined quality can always be obtained.

Figure 10:
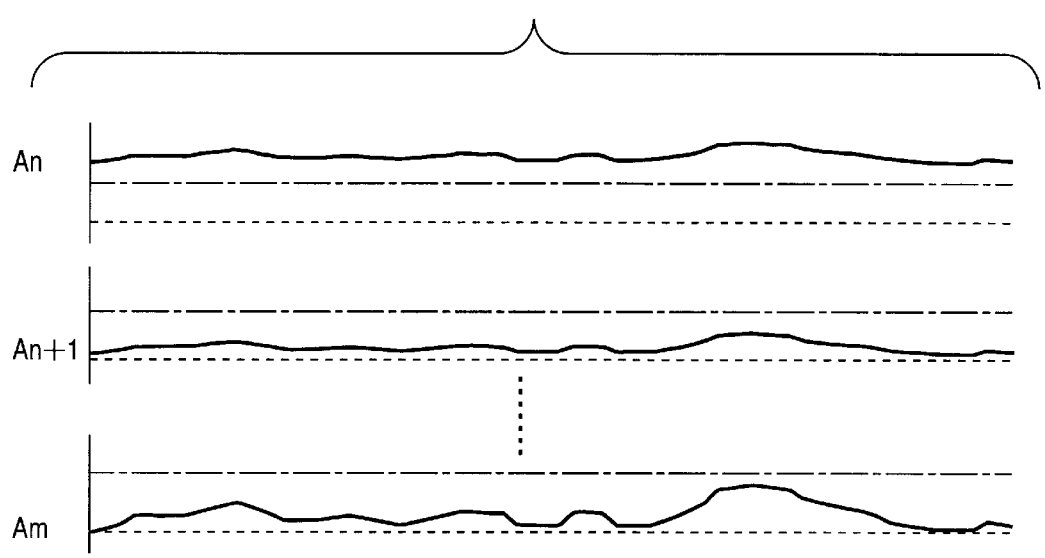
FIG. 10 is a waveform chart for explaining the skim operation of the linear sensor according to the first embodiment.

If disturbance light is very strong, the transferred charges in the ring CCD section 26 may saturate before the peak of the difference waveform B−A obtains a sufficient magnitude. In consideration of such a case, each of the linear sensors 20X and 20Y has a SKIM section 28 having a skim function. The SKIM section 28 monitors the level of the OFF signal. When the signal level is more than a predetermined value for An of nth time in FIG. 10 (alternate long and short dashed line in FIG. 10), the SKIM section 28 removes charges in a predetermined amount from each pixel of A and B. With this operation, a waveform represented by An+1 is obtained for the next (n+1)th time. Even when disturbance light is very strong, signal charges can be continuously accumulated without being saturated by repeating the above operation.

Hence, even when the amount of blinking light from the pointing device 4 is small, a signal waveform having a sufficient magnitude can be obtained by repeating the integration operation a number of times. Especially, when a light source in a visible light range is used for the pointing device 4, the signal of the display image is superposed on the light emission signal, and in this case, a sharp waveform free from noise can be obtained using the above-described skim function and difference output.

If very strong disturbance light is incident, the PEAK value is monitored, and when the PEAK value reaches a predetermined level, the accumulation operation may be stopped. In this case, an output waveform with a sufficient quality can be obtained even without increasing the number of times of accumulation, so reliable coordinate calculation can be performed. In addition, since the number of times of accumulation can be relatively small, the coordinate sampling rate per unit time improves as compared to when the incident light is weak (this means, e.g., that the coordinate sampling rate for coordinate calculation can be increased from 20 points/sec to 40 points/sec).

Operation control for the linear sensors 20X and 20Y will be described next with reference to FIG. 11.

Figure 11:
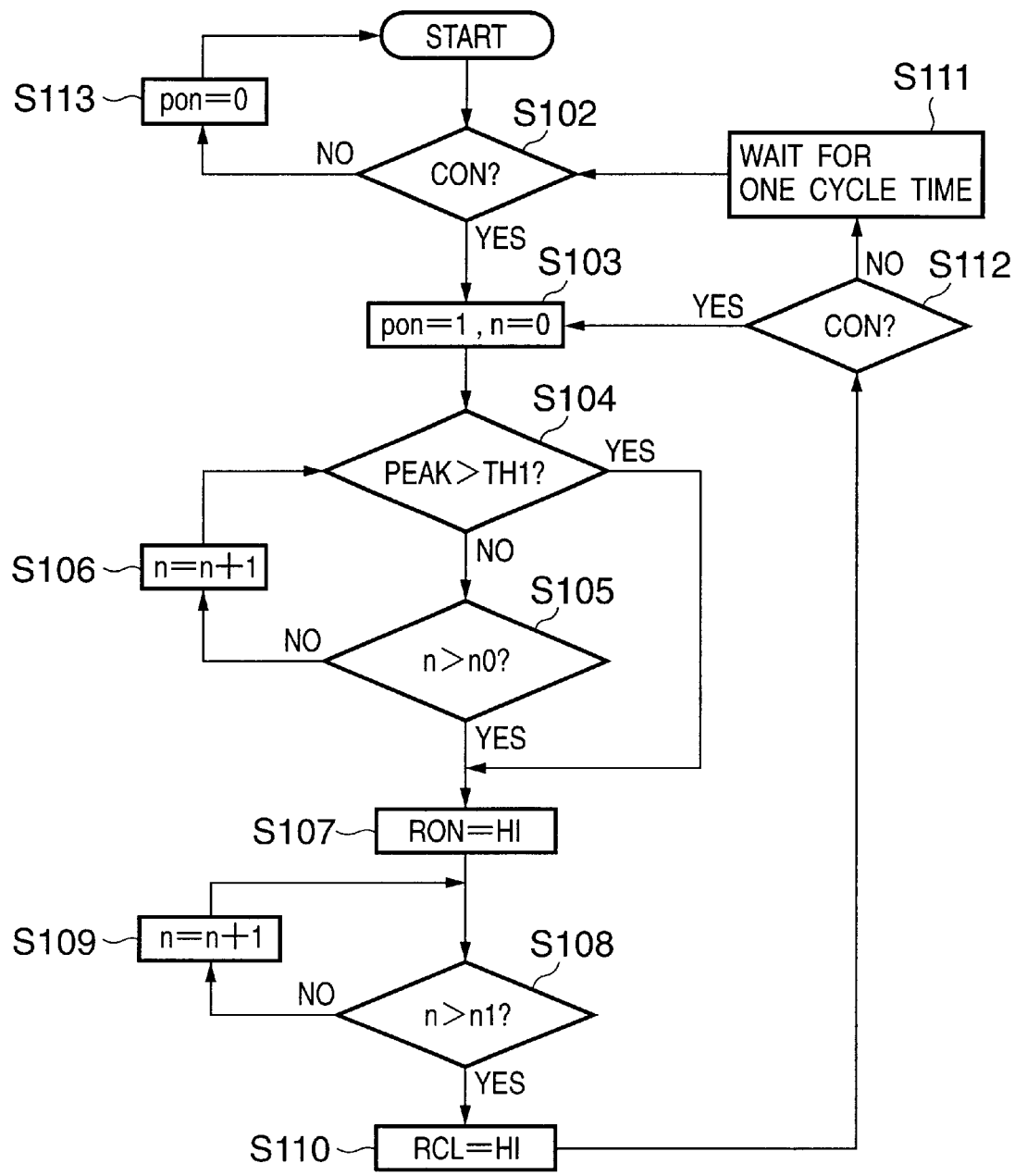
FIG. 11 is a flow chart showing operation control for the linear sensor according to the first embodiment.

FIG. 11 is a flow chart showing operation control for the linear sensor according to the first embodiment.

When the sensor control section 31 starts sensor control operation, the signal CON is monitored in step S102. If the signal CON is at high level (YES in step S102), the flow advances to step S103 to set a flag pon to 1 and reset the number n of times of accumulation to 0. It is determined in step S104 whether the PEAK value (peak level) of the sensor output is more than the predetermined value TH1.

If the PEAK value is smaller than the predetermined value TH1 (NO in step S104), it is determined in step S105 whether the number n of times of accumulation is larger than a first predetermined number n0 of times. If the number n of times of accumulation is smaller than the first predetermined number n0 of times (NO in step S105), the flow advances to step S106 to increment the number n of times of accumulation by one, and the flow returns to step S104. If the PEAK value is larger than the predetermined value TH1 (YES in step S104) or the number n of times of accumulation is larger than the first predetermined number n0 of times (YES in step S105), the flow advances to step S107. An integration stop signal RON goes high (HI) to stop the integration operation. Coordinate value calculation processing by the coordinate calculation section 32 is started.

Subsequently, it is determined in step S108 whether the number n of times of accumulation is larger than a second predetermined number n1 of times. If the number n of times of accumulation is smaller than the second predetermined number n1 of times (NO in step S109), the flow advances to step S109 to increment the number n of times of accumulation by one, and the flow returns to step S108. If the number n of times of accumulation is larger than the second predetermined number n1 of times (YES in step S108), the flow advances to step S110. The integration stop signal RON goes low, and simultaneously, the sensor reset signal RCL goes high during a period several times (twice in FIG. 6) the period of the signal LCK. In step S112, the signal CON is monitored. If the signal CON is at high level (YES in step S112), the flow advances to step S103. If the signal CON is at low level (NO in step S112), the flow advances to step S111 to wait for one cycle of processing.

That is, while the signal CON is at high level, the above operation is repeated, and coordinate value calculation processing is executed every cycle determined by the predetermined number n1 of times. Even when the signal CON drops due to the influence of dust or the like, the current state is held only once in step S111. If the signal CON is kept at low level during two continuous periods (NO in step S102), the flow advances to step S113 to reset the flag pon to 0. A sync signal waiting state is set, and the flow returns to the initial state.

The time as a measure against dropout may be longer than one cycle time. If disturbance is small, the time may be shortened. The same operation as described above can be executed even by defining one cycle here as an integer multiple of the period of the above-described data block in correspondence with the timing of the sync code and using a sync code detection signal in place of the signal CON.

Light from the pointing device 4 to the coordinate detector varies in accordance with consumption of the power supply (battery) 44 incorporated in the pointing device 4 and also varies depending on the posture of the pointing device 4. Especially, when the light diffusion of the screen 10 is small, the front luminance of a display image improves, though the variation in input light amount to the linear sensors 20X and 20Y due to the posture of the pointing device 4 becomes large. In the first embodiment, even in such a case, since the number of times of integration automatically follows up to always obtain a stable output signal, the coordinates can be stably detected. If light becomes incident on the linear sensors 20X and 20Y as a pointer that is not so largely scattered, considerably strong light is incident. Even in such a case, the coordinates can be obviously stably detected.

When both a pointer and a pen using an LED which is used in direct contact with the screen are used, an LED with a larger light amount can be used. Hence, the first predetermined number n0 of times and second predetermined number n1 of times as the number of times of integration shown in FIG. 11 may be switched by determining the pen or pointer in accordance with the ID signal so as to set a high coordinate sampling rate for the pen and a low sampling rate for the pointer. Actually, such switching is effective because delicate drawing operation such as character input is impossible with the pointer, and it is more convenient to draw a smooth line at a low coordinate sampling rate.

As described above, since a high-frequency carrier is added to the blinking light, and timing control of integration operation is done by a demodulated signal at a predetermined period which is obtained by frequency-detecting the carrier, a convenient coordinate input apparatus capable of synchronizing the pointing device and image carrier section without using any wire can be implemented. In addition, when a laser beam is used, easy operation from a position remote from the screen becomes possible. Furthermore, since an integration control means for stopping the integration operation upon detecting that the peak level in the difference signal from the integration section exceeds a predetermined level is arranged, a light spot image signal of almost predetermined level can be generated even when the light amount changes, and a stable high-resolution coordinate calculation result can always be obtained.

<Coordinate Value Calculation>

Coordinate calculation processing by the coordinate calculation section 32 will be described.

As described above, for the above coordinate input apparatus, a method of keeping a predetermined signal quality independently of the light amount incident on the linear sensors 20X and 20Y has been described, and this poses one problem. The above-described light amount varies in accordance with the consumption level of the power supply section (battery) 44 incorporated in the pointing device 4 and also is supposed to vary depending on the posture of the pointing device 4 (the pointing device 4 tilts in normal writing operation for inputting coordinates) or the difference in conversion efficiency between individual linear sensors or light-emitting elements.

When light reaching the linear sensors 20X and 20Y decreases, a high-quality signal waveform can be obtained by prolonging the integration time, i.e., increasing the values of the first predetermined number n0 of times and second predetermined number n1 of times to increase the number of times of integration. However, an increase in integration time means a decrease in coordinate sampling rate, i.e., the number of coordinate points that can be calculated for the unit time, and to faithfully reproduce the hand-writing of the operator, the integration time cannot be increased without any limitation. For example, assume that to faithfully reproduce the hand-writing, a coordinate sampling rate of 25 points/sec is necessary. One coordinate calculation operation time must be 40 msec or less, and the signal waveform must reach the predetermined peak level in an integration time within that time.

However, if coordinates can be calculated at high reliability even when the peak level of a predetermined level cannot be obtained, a pointing device that is convenient for the operator in hand-writing (e.g., the pointing device can be more greatly tilted) can be implemented, and the service life of the battery can be prolonged.

Figure 12:
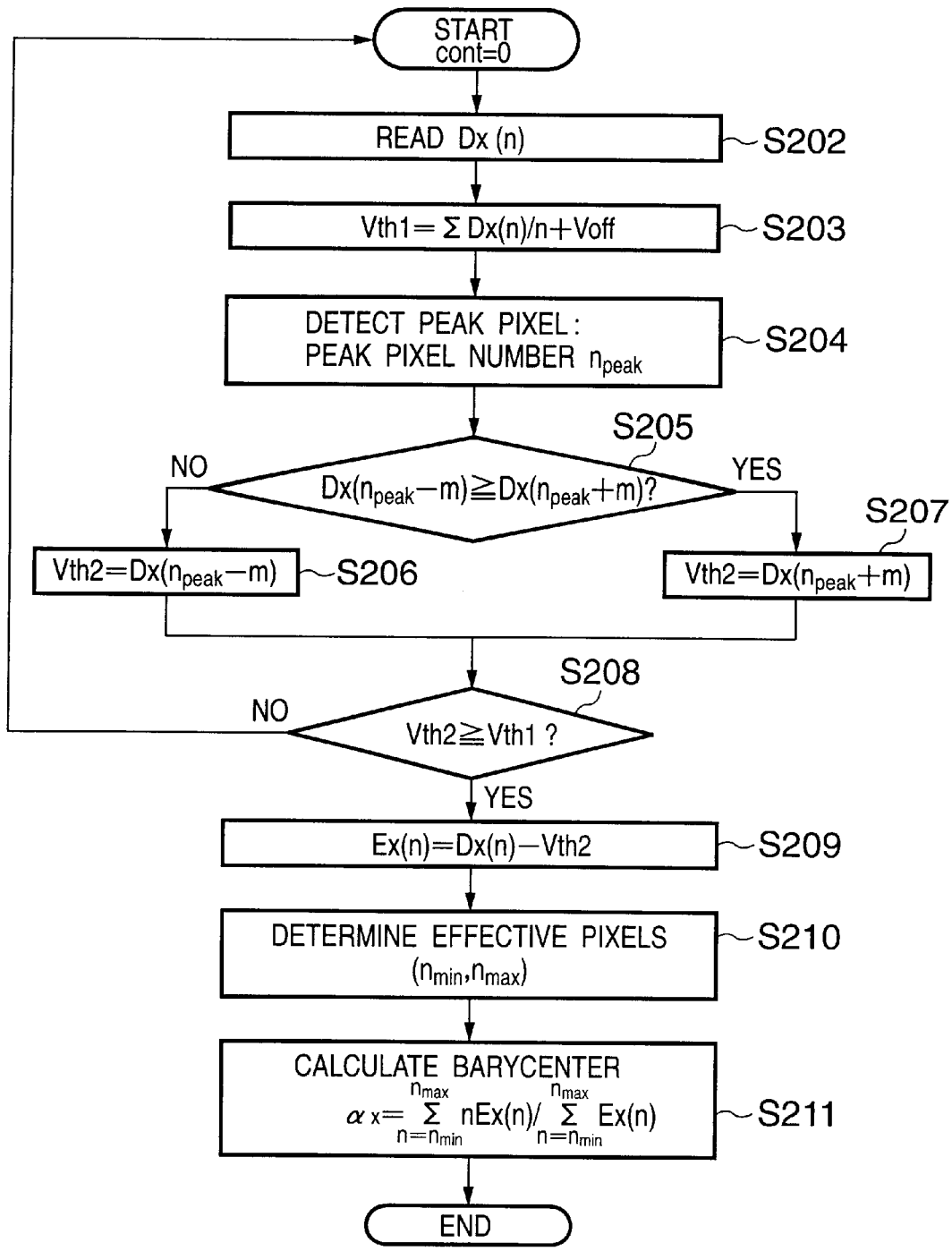
FIG. 12 is a flow chart showing the process flow of coordinate calculation processing according to the first embodiment.

The coordinate calculation section 32 according to the first embodiment executes coordinate calculation processing as shown in FIG. 12.

The output signal from the two linear sensors 20X and 20Y obtained by the above-described method (difference signal from the amplifier 29) is converted into a digital signal by the A/D conversion section 31A in the sensor control section 31 and sent to the coordinate calculation section 32 to calculate the coordinate values. To calculate the coordinate values, first, the coordinate values (X1,Y1) of the linear sensors 20X and 20Y are obtained for the X- and Y-coordinate outputs in the respective directions. The calculation processing is common to the X- and Y-coordinates, and only calculation of the X-coordinate value will be described.

The process flow of coordinate calculation processing according to the first embodiment will be described next with reference to FIG. 12.

FIG. 12 is a flow chart showing the process flow of coordinate calculation processing according to the first embodiment.

At the start of processing, a counter cont for counting the number of times of processing is set to 0.

In step S202, difference data Dx(n) (e.g., the number n of pixels=64) as the difference signal of each pixel at an arbitrary coordinate input point is read. In step S203, the average value of output values of the respective pixels (64 pixels) is derived, and Vth1 with an additional predetermined offset amount Voff is defined. The value Vth1 is used as the first threshold value used to determine the validity of the output signal (see FIG. 13A). That is, since the threshold value Vth1 can be changed in accordance with the light amount input to the linear sensors, i.e., the signal level and also depends on the output voltage when no light amount is incident, the component tolerance between individual linear sensors can be absorbed, and an optimum threshold level can be automatically set.

In step S204, a peak pixel $n_{peak}$ having a maximum value of the difference data Dx(n) is detected. In step S205, the output values $Dx(n_{peak}-m)$ and $Dx(n_{peak}+m)$ of the mth pixels before and after the peak pixel $n_{peak}$ are obtained and compared. In steps S206 and S207, a second threshold value Vth2 is set to $Dx(n_{peak}-m)$ or $Dx(n_{peak}+m)$ in accordance with the comparison result. In the first embodiment, a value for a lower signal level is used as the threshold level. FIG. 13B shows a state when m=3, and in which the threshold value is set to $Dx(n_{peak}-m)$. In the first embodiment, a smaller value of the two signal levels is employed as the threshold level. However, the same effect as described above can be obtained even when a value of higher signal level is employed as the threshold level.

In step S208, the first threshold value Vth1 and second threshold value Vth2 are compared. When the second threshold value Vth2 is equal to or larger than the first threshold value Vth1 (YES in step S208), it is determined that effective light is sufficiently incident, and coordinate calculation from step S209 is executed. If the second threshold value Vth2 is smaller than the first threshold value Vth1 (NO in step S208), no sufficient effective light is obtained, and the processing is stopped.

In step S209, a difference Ex(n) between the second threshold value Vth2 and the difference data Dx(n) of each pixel is stored in the nonvolatile memory 9. In step S210, effective pixels for coordinate calculation are determined. The effective pixels mean continuous pixels including the peak pixel $n_{peak}$ whose output value exceeds the second threshold value Vth2. The effective pixels correspond to pixels from a pixel having a minimum value $n_{min}$ in pixels before the peak pixel $n_{peak}$, whose output values continuously exceed the second threshold value Vth, to a pixel having a maximum value $n_{max}$ in pixels after the peak pixel $n_{peak}$, whose output values continuously exceed the second threshold value Vth. In the example shown in FIG. 13C, the minimum value $n_{min}$ is $n_{peak}-m$, and its difference data is $Dx(n_{peak}-m)$, and the maximum value $n_{max}$ is $n_{peak}+m+1$, and its difference data is $Dx(n_{peak}+m+1)$. In this case, the output value from a pixel with a value $n_{peak}+m+1$ larger than $n_{peak}+m$ is also used as effective data for coordinate calculation. Referring to FIG. 13C, any other pixels that exceed the second threshold value Vth2 are not used as effective pixels because they do not satisfy the condition of continuity.

In step S211, a pixel coordinate $\alpha_X$ as the barycentric value on the linear sensor 20X is calculated using the output values of the effective pixels. In the first embodiment, the barycenter of output data is calculated by the barycentric method. However, the mathematical method of obtaining the pixel coordinate $\alpha_X$ is not limited to the above method, and for example, a method of obtaining the peak value of the output data Ex(n) (by, e.g., the differential method) may also be used.

With the above arrangement, even when the light amount is small, the pixel number to be obtained can be stably accurately calculated.

Figure 14B:
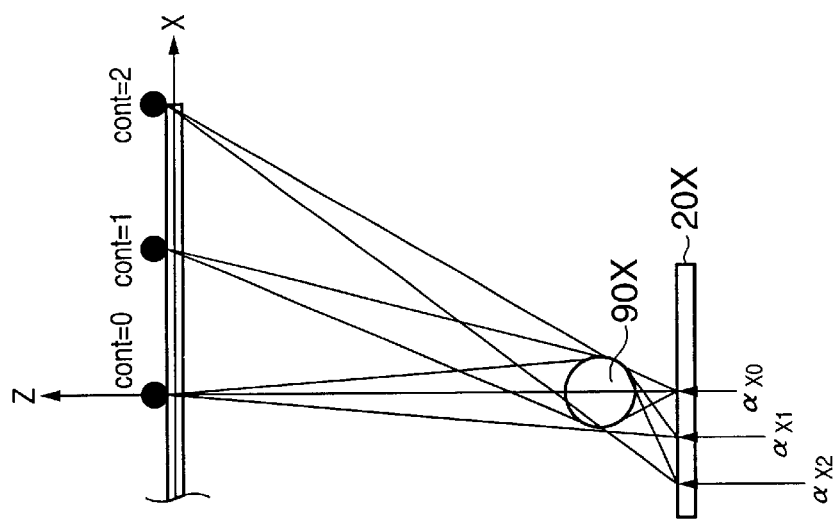
FIGS. 14A and 14B are views showing the arrangement of an imaging optical system according to the first embodiment.
Figure 14A:
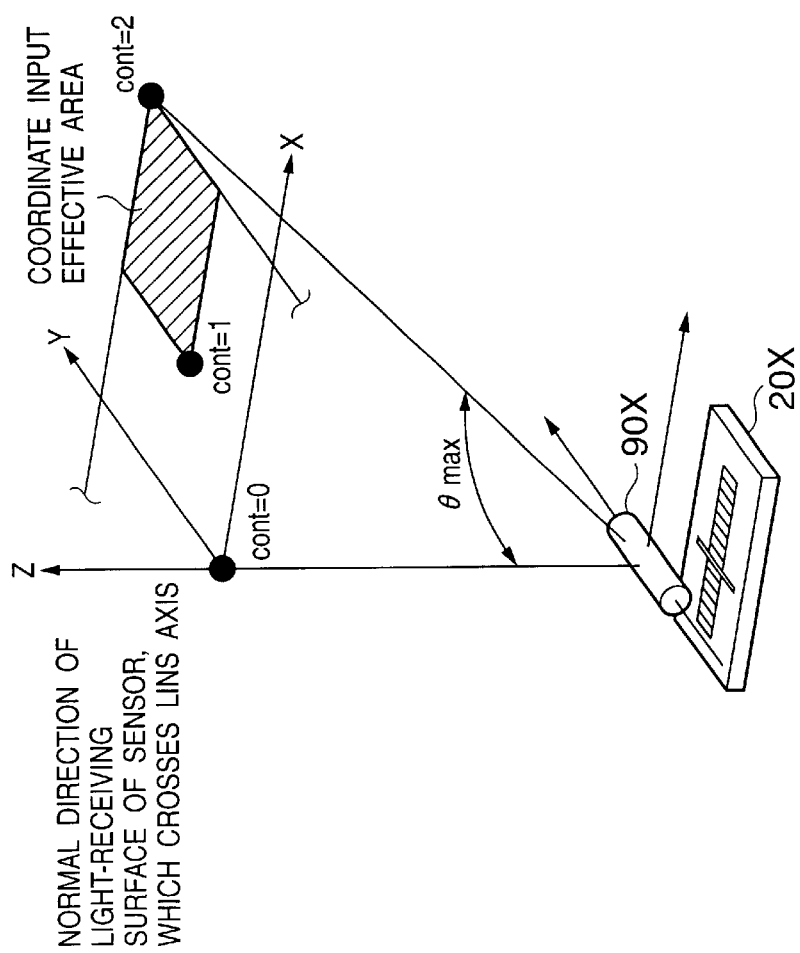

A method of obtaining the coordinate values of the pointing device 4 from the pixel coordinate $\alpha_X$ as the calculated barycentric value will be described next. Before that, the arrangement of the imaging optical system according to the first embodiment will be described with reference to FIGS. 14A and 14B. FIGS. 14A and 14B explain only the arrangement in the X-axis direction, and the arrangement in the Y-axis direction is the same as in FIGS. 14A and 14B.

FIGS. 14A and 14B are views showing the arrangement of the imaging optical system according to the first embodiment.

As shown in FIGS. 14A and 14B, the imaging optical system is laid out such that the light beam of the light spot 5 at the central portion (origin: cont=0) of the coordinate input effective area is focused, through the cylindrical lens 90X, to almost the central portion of the linear sensor 20X arranged in parallel to the coordinate input surface.

As the cylindrical lens 90X, lenses of two types can be used: a lens whose section perpendicular to the lens axis has a simple circular shape, and a lens having an aspherical section along the lens axis. An inexpensive plastic lens whose section parallel to the lens axis has the same shape and which is relatively easy to manufacture is employed. Only the effective surface as the lens, which is necessary in the coordinate input apparatus, need satisfy the above definition. Facilitating lens attachment by providing a support member for installation or the like in the remaining region can be easily realized by integral molding of the plastic lens without posing any functional problem. The lens may be formed from another material such as glass.

As described above in the section of "problem", the coordinate calculation accuracy largely degrades at the four corners of the coordinate input effective area due to the influence of the optical layout of the imaging optical system and the optical characteristics of the cylindrical lenses and the like in the coordinate input apparatus according to the first embodiment. Calculation and correction methods for accurate derivation of coordinates will be described with reference to FIG. 15.

Figure 15:
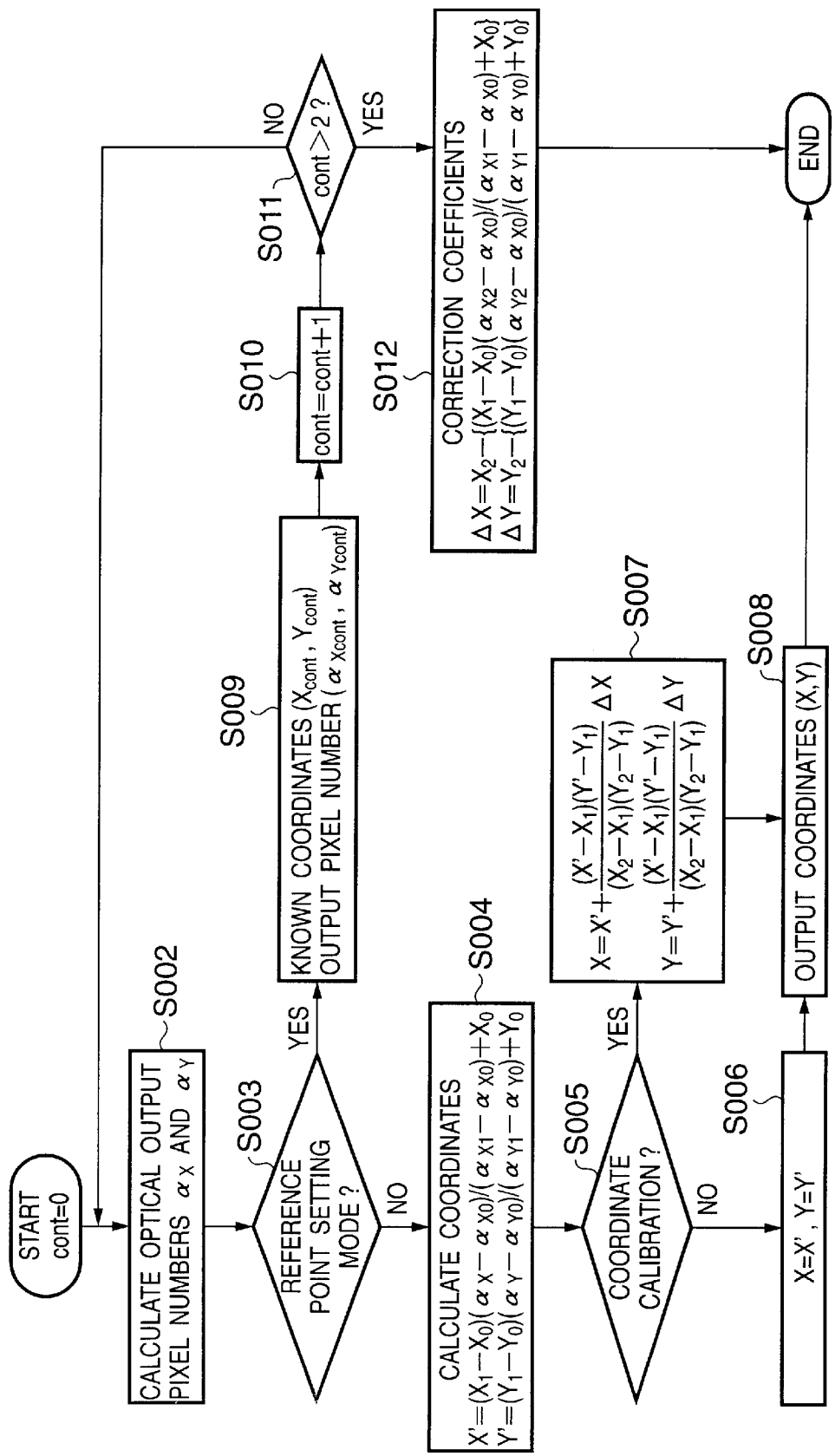
FIG. 15 is a flow chart showing the detailed process flow of coordinate calculation processing according to the first embodiment.

FIG. 15 is a flow chart showing the detailed process flow of coordinate calculation processing according to the first embodiment.

To calculate coordinates from the pixel coordinate $\alpha_X$ calculated by the flow shown in FIG. 12, a predetermined value for setting the reference point must be calculated at the time of initial operation. In step S003, it is determined whether a routine for calculating the predetermined value (reference point setting mode) or a normal mode for calculating coordinate values on the basis of the predetermined value (coordinate calculation mode) is to be executed.

The reference point setting mode is normally done at the time of shipment from the factory and executed on the basis of an instruction from the pointing device 4 or a predetermined switch prepared on the coordinate input apparatus main body.

In the reference point setting mode, in the first embodiment, coordinate values $(X_{cont}, Y_{cont})$ of at least three known points on the screen 10 and barycentric values $\alpha_{Xcont}$ and $\alpha_{Ycont}$ at each point are calculated, unlike the prior art. More accurate coordinate calculation is realized on the basis of the calculated coordinate values of the three known points and their barycentric values.

More specifically, in step S002, the above-described processing in steps S202 to S211 is executed while designating the coordinate values $(X_0, Y_0)$ of the first known point on the screen 10 when the counter cont=0, thereby calculating the coordinate values and barycentric values $\alpha_{X0}$ and $\alpha_{Y0}$. In step S003, it is determined whether the reference point setting mode is to be executed. If the reference point setting mode is not to be executed (NO in step S003), the flow advances to step S004. If the reference point setting mode is to be executed (YES in step S003), the flow advances to step S009.

In step S009, the calculated coordinate values and barycentric value $\alpha_{X0}$ are stored in the nonvolatile memory 9. In step S010, the counter cont is incremented by one. In step S011, it is determined whether the counter value of the counter cont is larger than 2. If the counter value is smaller than 2 (in this case, cont=1, and NO in step S011), the flow returns to step S002 to execute the above-described processing in steps S202 to S212 while designating the coordinate values $(X_1, Y_1)$ of the second known point, and the coordinate values and barycentric values $\alpha_{X1}$ and $\alpha_{Y1}$ are stored in the nonvolatile memory 9 in step S009. In step S010, the counter cont is incremented by one to counter value "2". In this case, since the counter value is not larger than 2, the flow returns to step S002 again to execute the above-described processing in steps S202 to S212 while designating the coordinate values $(X_2, Y_2)$ of the third known point, and the coordinate values and barycentric values $\alpha_{X2}$ and $\alpha_{Y2}$ are stored in the nonvolatile memory 9 in step S009. In step S010, the counter cont is incremented by one to counter value "3". It is determined in step S011 that the counter value of the counter cont is larger than 2, and the flow advances to step S012.

With the above processing, the coordinate values $(X_0, Y_0)$ to $(X_2, Y_2)$ of the known points and their barycentric values $\alpha_{X0}$ to $\alpha_{X2}$ and $\alpha_{Y0}$ to $\alpha_{Y2}$ are stored in the nonvolatile memory 9 as reference points.

In this embodiment, the first known point $(X_0, Y_0)$ is set at the central position of the coordinate input effective area, the second known point $(X_1, Y_1)$ is set at the central position (cont=1) of the coordinate input effective area in each quadrant (¼ region of the coordinate input effective area in FIG. 14A), and the third known point $(X_2, Y_2)$ is set at least at one of the four corners of the coordinate input effective area.

As shown in FIG. 14A, at the third known point, an angle θ between the Z-axis and the light beam from the light spot 5 in the coordinate input effective area is maximized.

As described above, in the coordinate input apparatus of this type which has the cylindrical lens 90X in the imaging optical system, the coordinate calculation accuracy degrades due to the optical characteristics of the lens and the like at the position where the angle made by the axis of the cylindrical lens 90X and the light beam from the light spot 5 is maximized. The rate of occurrence of degradation depends on the coordinate input position (both the X- and the Y-axis directions). The coordinate calculation accuracy nonlinearly degrades as the X-axis value increases and the Y-axis value increases (see FIG. 16).

To suppress the phenomenon that the coordinate calculation accuracy nonlinearly degrades and allow highly accurate coordinate calculation, in the first embodiment, highly accurate coordinate calculation is realized using the coordinate values and barycentric values of the three known points. Processing from step S004 and processing in step S012 indicate the coordinate calculation method.

In step S004, using the barycentric values $\alpha_{X0}$ and $\alpha_{X1}$ and coordinate values $(X_0,Y_0)$ and $(X_1,Y_1)$ stored in the memory 9 in step S009, a position X' of the light spot 5 at an arbitrary point can be schematically calculated by $$X' = (X_1 - X_0)(\alpha_X - \alpha_{X0})/(\alpha_{X1} - \alpha_{X0}) + X_0 \quad (3a)$$

(first calculation).

When X' is calculated in accordance with equation (3a) using the output barycentric value $\alpha_{X2}$ of the sensor at the coordinate values $(X_2,Y_2)$ of the third known point where the coordinate calculation accuracy is lowest, the difference between the value X' and the known coordinate $X_2$ is obtained as a coordinate calculation measurement error $\Delta X$ (step S012).

The output coordinate values are calibrated using the error $\Delta X$ as a correction coefficient. In storing the output pixels at the above-described known points, the correction coefficient $\Delta X$ may be calculated and stored in the memory 9 or signal processing section 7. For the Y-direction as well, Y' can be calculated using equation (3b) below corresponding to equation (3a). A difference $\Delta Y$ between the values Y' and $Y_2$ is also stored in the memory 9 as a correction coefficient.

$$Y' = (Y_1 - Y_0)(\alpha_Y - \alpha_{Y0})/(\alpha_{Y1} - \alpha_{Y0}) + Y_0 \quad (3b)$$

Figure 17:
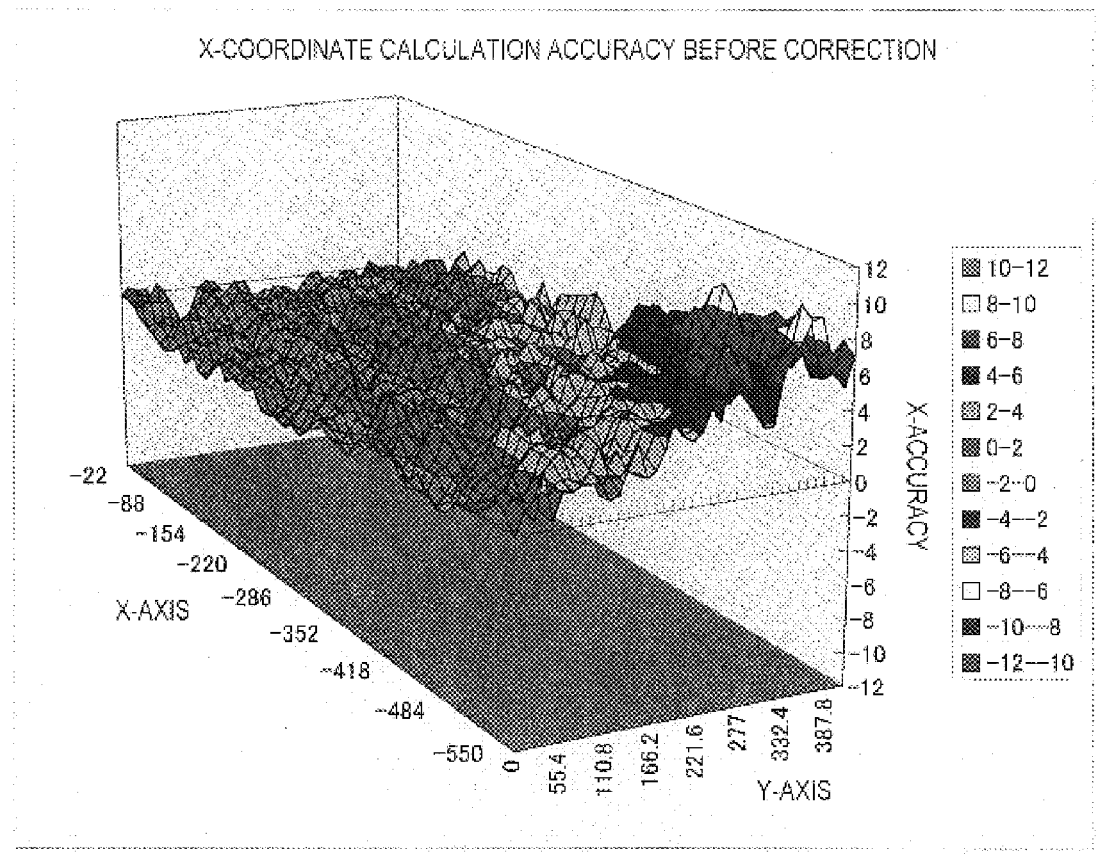
FIG. 17 is a graph showing the coordinate calculation accuracy distribution of a conventional coordinate input apparatus.

As shown in FIG. 17, as the value X becomes large, and the value Y becomes large, the coordinate calculation accuracy degrades due to the optical characteristics (the hatched portion of the coordinate input effective area in FIG. 14A and especially a portion corresponding to cont=2). Hence, using the output coordinate values (X',Y') by the first calculation based on equations (3a) and (3b), it is determined whether the output coordinate values correspond to the determination region of the hatched portion. In step S005, it is determined whether coordinate calibration is necessary. If the output coordinate values fall outside the determination region (outside the hatched portion), coordinate calibration is unnecessary. The flow advances to step S006 to define the coordinate values (X',Y') by the first calculation, and the coordinate values are output in step S008.

If the output coordinate values are in the determination region, coordinate calibration is necessary. The flow advances to step S007 to correct the coordinate values by $$X = X' + \Delta X(X' - X_1)(Y' - Y_1)/(X_2 - X_1)(Y_2 - Y_1) \quad (4)$$

(second calculation) using the coordinate values (X',Y') output by the first calculation and the correction coefficient $\Delta X$, and the corrected coordinate values are output in step S008.

Equation (4) is designed to calculate the defined coordinate X (X is the dependent function of X' and Y') using both the coordinate values (X',Y') by the first calculation so as to cope with a nonlinear coordinate calculation error by the coordinate input position and also to calculate the same coordinate values independently of whether the coordinate values are calculated only by the first calculation (steps S004 and S006) or the coordinate values are calculated by the second calculation (steps S004 and S007) or even when the coordinate values are input to the determination region boundary portion. That is, even when the coordinates are input on the boundary of the determination region, the resolving power of the coordinate input apparatus does not lower because no difference in coordinate values is generated due to the difference depending on the calculation method.

The corrected value Y can be calculated using an equation corresponding to equation (4) (X' of the first term is replaced with Y' and $\Delta X$ of the second term is replaced with $\Delta Y$).

In the above calculation, region determination is done in step S005. However, in consideration of the nonlinearity of error generation (the coordinate calculation accuracy becomes low as the X-axis value increases and the Y-axis value increases), the second calculation may be always executed using a correction equation of higher order below without executing determination in step S005. In this case, coordinate calculation performance equivalent to that of the above-described method can be obtained. In addition, when this equation is used, the determination condition is omitted, and the processing speed can be increased. The equation to be used is appropriately selected depending on the specifications such as the CPU or memory.

$$X = X' + \Delta X(X'/X_2)^2(Y'/Y_2)^2$$

With the above processing, the coordinate calculation accuracy largely improves as compared to the coordinate calculation accuracy (FIG. 17) as a coordinate calculation result by the conventional method, as is apparent from the coordinate calculation accuracy (FIG. 16) as a coordinate calculation result by the first embodiment.

As described above, according to the first embodiment, the coordinate values and barycentric values of known positions on the screen 10 are stored, and the calculation method is improved by region determination on the basis of the calculated coordinate values, thereby largely improving the coordinate calculation accuracy without reducing the resolving power. In addition, since the coordinate input apparatus can be practiced using a cylindrical lenses having a simple shape, an inexpensive coordinate input apparatus for outputting coordinates at a high accuracy and resolving power can be implemented.

The coordinate values defined by the above embodiment may be output in real time, or the data may be subsampled in accordance with the purpose (for example, only one data is output every 10 defined coordinates). This is important when the following specifications are assumed.

The stability of the user's hand changes between a mode wherein the pointing device 4 is used as if it were a pen and a mode wherein the pointing device 4 is used as a pointer at a position remote from the screen. When the pointing device is used as a pointer, the cursor on the screen finely vibrates. When such fine vibration is suppressed, the operability is improved. On the other hand, when the device is used as a pen, follow-up as faithful and quick as possible is required. Especially, in writing characters and the like, correct input is impossible unless fine and quick operation is possible.

In the first embodiment, the ID is transmitted by a control signal. Whether the pointing device is of a pointer type can be determined depending on whether the switch at the tip is pressed. Hence, it can be determined whether the pointing device is used as a pointer or pen. When the pointing device is used as a pointer, for example, a moving average is calculated using immediately and second preceding coordinate values (X−1,Y−1) and (X−2,Y−2), thereby calculating the current output coordinate values (X,Y). With this arrangement, the blur can be minimized, and the operability can be improved.

In the first embodiment, coordinate calculation when the pointing device is used as a pointer is done using a simple moving average. As a function used for smoothing processing for calculating such a moving average, various schemes can be used, including a method of nonlinearly compressing the absolute difference value depending on the magnitude or a method of nonlinearly compressing the difference between the moving average and the predicted value of the moving average. That is, switching between relatively strong smoothing for a pointing device used as a pointer and relatively weak smoothing for a pointing device used as a pen is possible by a control signal. The present invention offers a large effect in this point because a state which is convenient to use can be realized.

The coordinate calculation processing need be ended within 10 msec when the coordinate sampling rate is 100 Hz, as described above. Since the data amount is as small as 64 pixels×2 (X- and Y-coordinates)×8 bits of A/D conversion circuit, and no convergence calculation is necessary, a low-speed 8-bit 1-chip microprocessor can sufficiently-execute the processing. This is advantageous for the cost. In addition, the specifications are easy to change, the development period can be shortened, and various derivative products can be developed. Especially, no dedicated LSI for high-speed image data processing need be developed, unlike an apparatus using an area sensor, so advantages in respects of development cost, development period, and the like are very large.

The data signal representing the coordinate values (X,Y) calculated by the above-described calculation processing is sent from the coordinate calculation section 32 to the communication control section 33. The communication control section 33 receives the data signal and the control signal from the control signal detection section 72. The data signal and control signal are converted into communication signals having a predetermined format and sent to the external display control unit. Thus, various operations of operating the cursor on the screen 10, selecting the menu, and inputting characters and line drawings can be performed. As described above, even when a sensor array having 64 pixels is used, a coordinate input apparatus capable of obtaining a sufficient accuracy by a resolving power of 1,000 or more, using the linear sensor and optical system having compact and inexpensive arrangements, and having a small-scale arithmetic circuit can be obtained.

<Second Embodiment>

Figure 18:
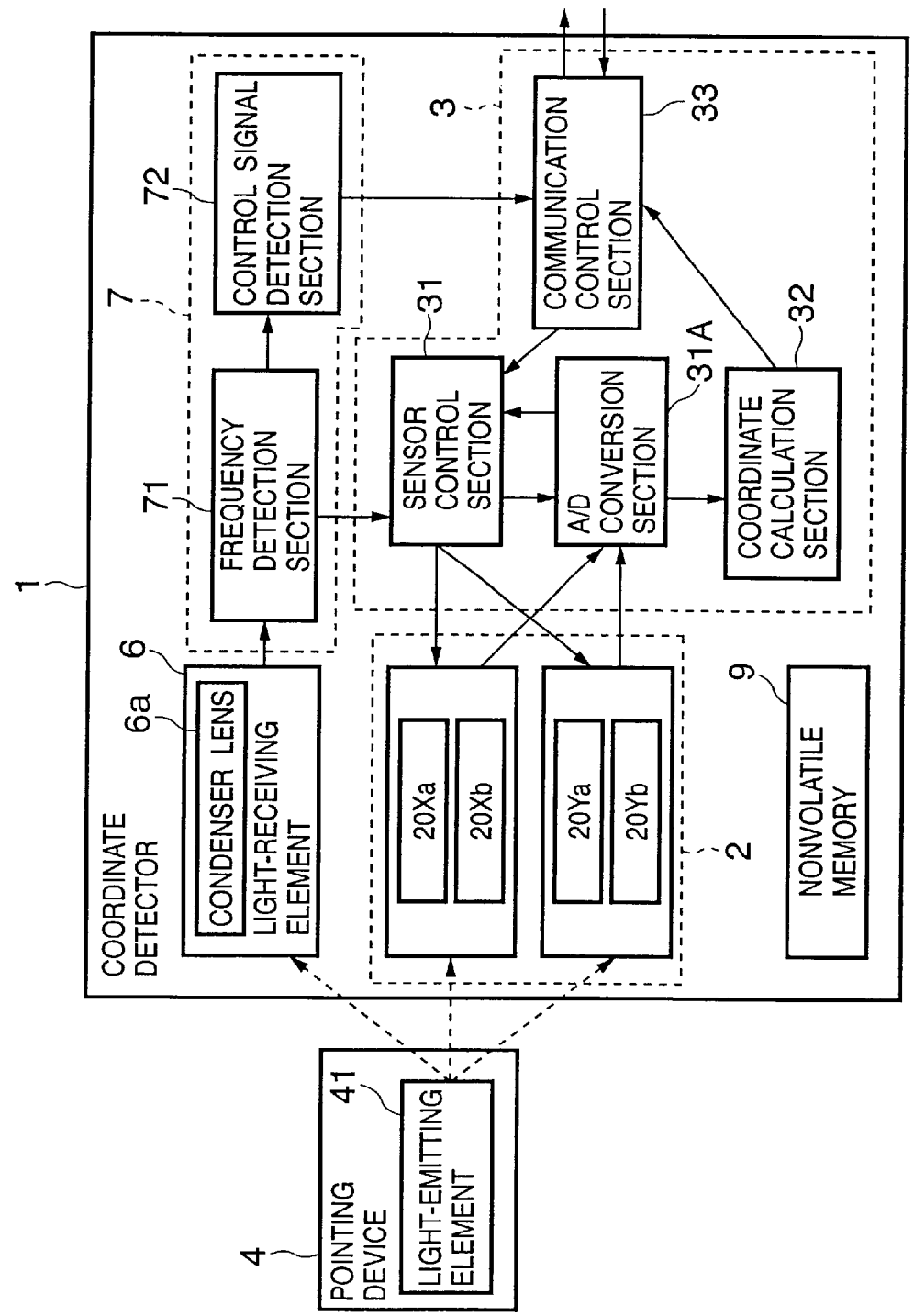
FIG. 18 is a block diagram showing the detailed arrangement of a coordinate detector according to the second embodiment.

FIG. 18 is a block diagram showing the detailed arrangement of a coordinate detector according to the second embodiment.

The coordinate detector according to the second embodiment is a modification of the coordinate detector of the first embodiment. The same reference numerals as in the first embodiment denote the same elements in the second embodiment, and a detailed description thereof will be omitted.

A coordinate detector 1 according to the second embodiment has four linear sensors 20Xa, 20Xb, 20Ya, and 20Yb for detecting the direction of arrival of light by an imaging optical system. The linear sensors 20Xa, 20Xb, 20Ya, and 20Yb receive diffused light from a light spot 5 formed on a screen 10 by a light beam from a light-emitting element 41 incorporated in a pointing device 4.

As described above in the first embodiment, a light-receiving element 6 has a condenser lens 6a serving as a condenser optical system to detect the amount of light having a predetermined wavelength at a high sensitivity from the full range of the screen 10. The detection output is detected by a frequency detection section 71 and demodulated into a digital signal containing data such as a control signal (signal superposed by a light emission control section 42 of the pointing device 4) by a control signal detection section 72.

In the second embodiment, since no means such as a code for transmitting a timing signal is used, the linear sensors 20Xa, 20Xb, 20Ya, and 20Yb are controlled by a modulated signal. The signal is detected by the difference between the ON mode and the OFF mode, as will be described later. To synchronize the shutter timing and light emission timing, a reset signal for the linear sensors 20Xa, 20Xb, 20Ya, and 20Yb is generated using the timing of the modulated signal.

The timing charts handled by the frequency detection section 71 will be described with reference to FIG. 19.

Figure 19:
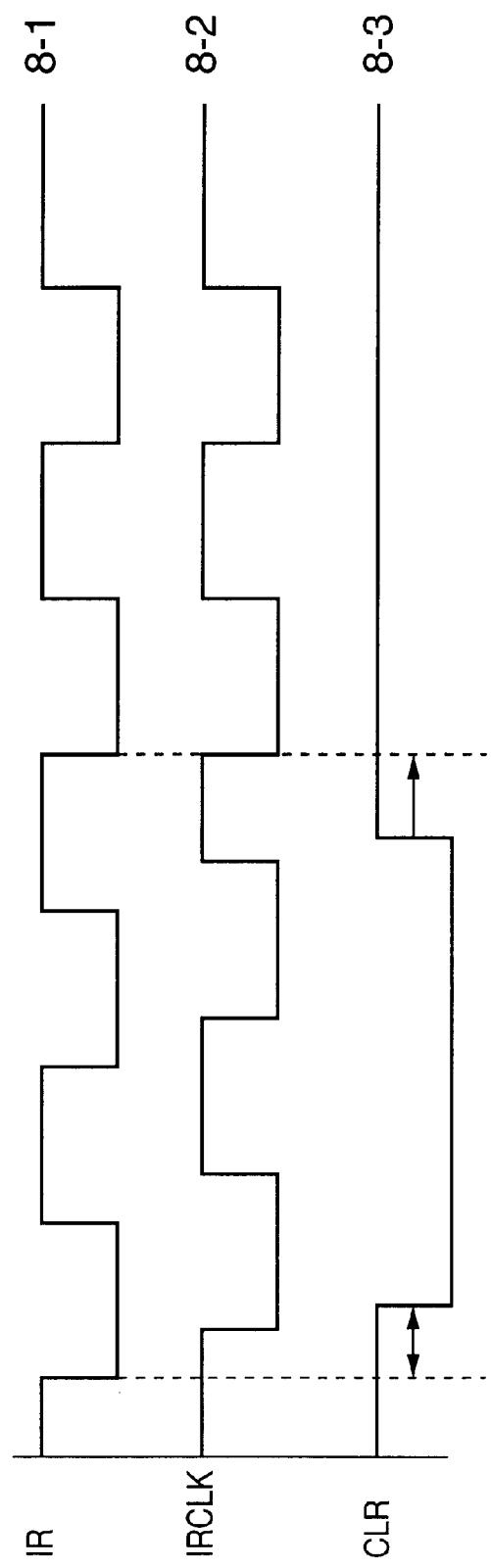
FIG. 19 is a timing chart showing signals handled in the second embodiment.

FIG. 19 is a timing chart showing signals handled in this embodiment.

Referring to FIG. 19, 8-1 represents a signal IR after the modulated signal in the pen down state is detected by the frequency detection section 71. Since the signal IR represents a so-called light emission period, the shutter timing of the linear sensors 20Xa, 20Xb, 20Ya, and 20Yb must be synchronized with this signal.

On the other hand, 8-2 represents a signal IRCLK representing the shutter cycle of the linear sensors 20Xa, 20Xb, 20Ya, and 20Yb, i.e., a timing for executing detection in the ON state at L (low level) and detection in the OFF state at H (high level). The signal IRCLK is output from the linear sensors 20Xa, 20Xb, 20Ya, and 20Yb in accordance with a clock supplied to the linear sensors 20Xa, 20Xb, 20Ya, and 20Yb. To synchronize the signal IRCLK with the light emission period, when the signal IR represented by 8-1 is detected, a clear (CLR) signal is output to the linear sensors 20Xa, 20Xb, 20Ya, and 20Yb represented by 8-3 after a predetermined delay time with which the signal IR and signal IRCLK synchronize each other.

This clear operation enables synchronization. The delay amount is determined depending on the time until the signal IRCLK goes low after the CLR signal is ended.

<Description of Operation of Imaging Optical System>

Figure 20:
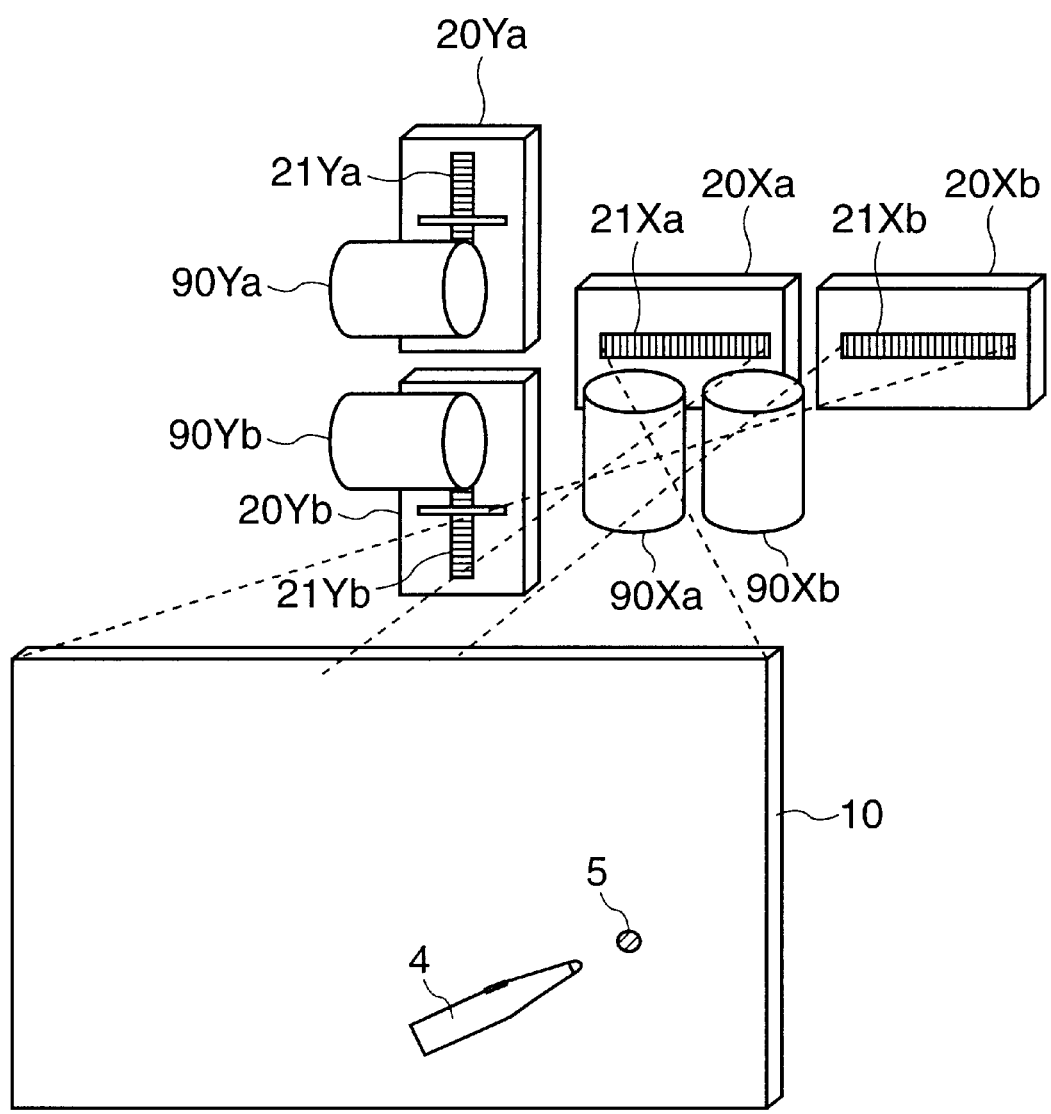
FIG. 20 is a view showing the layout relationship between linear sensors according to the second embodiment.

FIG. 20 is a view showing the layout relationship between the linear sensors 20Xa, 20Xb, 20Ya, and 20Yb.

Referring to FIG. 20, the light spot 5 forms linear images on photosensitive portions 21Xa, 21Xb, 21Ya, and 21Yb of the linear sensors 20Xa, 20Xb, 20Ya, and 20Yb through cylindrical lenses 90Xa, 90Xb, 90Ya, and 90Yb serving as an imaging optical system. When the linear sensors 20Xa, 20Xb, 20Ya, and 20Yb are accurately laid out perpendicularly to each other, each linear sensor can obtain an output with a peak on a pixel that reflects the X- or Y-coordinate.

The linear sensors linear sensors 20Xa, 20Xb, 20Ya, and 20Yb are controlled by a sensor control section 31. The output signals are converted into digital signals by an A/D conversion section 31A connected to the sensor control section 31 and sent to a coordinate calculation section 32. The coordinate calculation section 32 calculates the output coordinate values from the received digital signals and sends the calculation result to an external control unit (not shown)

through a communication control section 33 together with data such as the control signal from the control signal detection section 72 using a predetermined communication method. To execute operation (e.g., user calibration value setting) different from the normal operation for adjustment, a mode switching signal is sent from the communication control section 33 to the sensor control section 31 and coordinate calculation section 32.

The structure of the linear sensors 20X$a$, 20X$b$, 20Y$a$, and 20Y$b$ related to the image of the light spot 5 is the same as that of the linear sensors 20X and 20Y of the first embodiment. A description of the detailed structure and output waveform of each linear sensor is the same as that made in the first embodiment with reference to FIGS. 8 to 10.

The timing chart of output control for a ring CCD section 26 will be described next with reference to FIG. 21.

Figure 21:
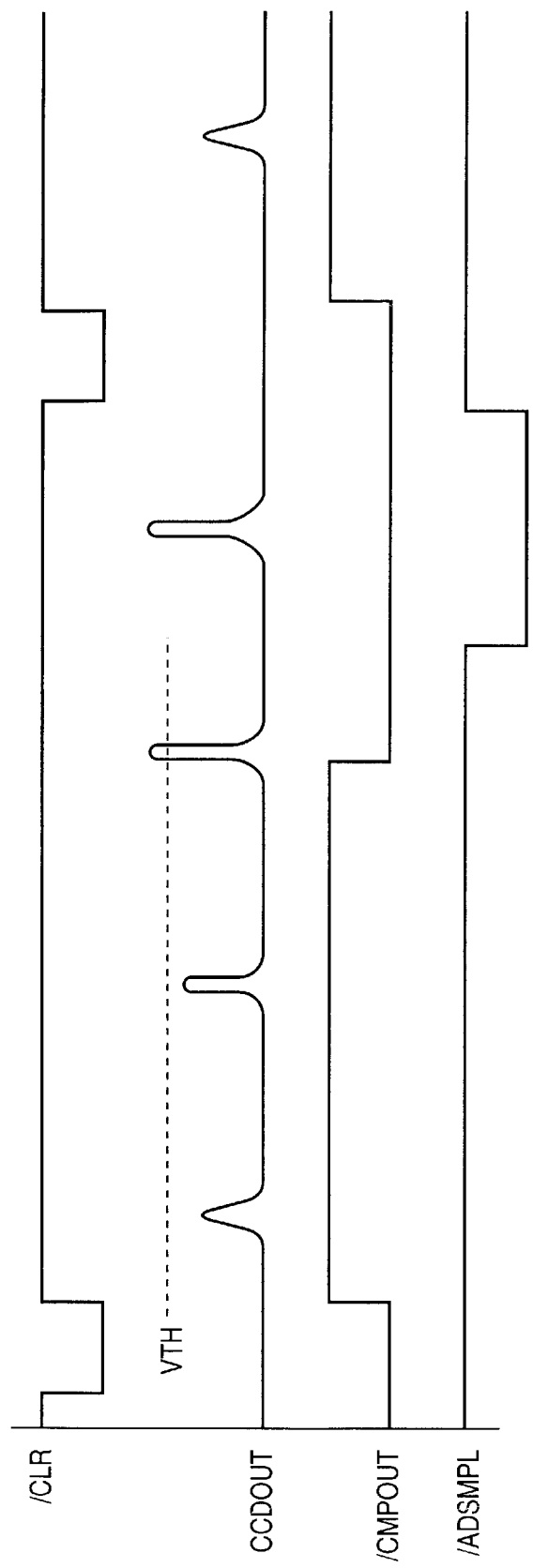
FIG. 21 is a timing chart of ring CCD output control according to the second embodiment.

FIG. 21 is a timing chart of ring CCD output control according to the second embodiment.

First, all operations are cleared by the CLR signal after a predetermined delay time for the signal IR. After that, when input from the pointing device 4 is detected, a detection signal such as a signal CCDOUT becomes large in accordance with integration operation. When the signal level exceeds a predetermined level (VTH), a CMPOUT signal output from the comparator falls to stop the integration operation of the ring CCD 26. When the CMPOUT signal falls, the sensor control section 31 starts A/D conversion. The A/D conversion is performed for all pixel outputs of the ring CCD 26, as indicated by an ADSMPL signal.

As described above, when the output from the ring CCD 26 does not exceed the predetermined level, the sensor control section 31 counts the elapse time from the clear timing, and when the time exceeds a predetermined time, forcibly executes the A/D conversion operation. With this arrangement, even when the input is small, sampling is always executed within a predetermined sampling time.

Figure 22:
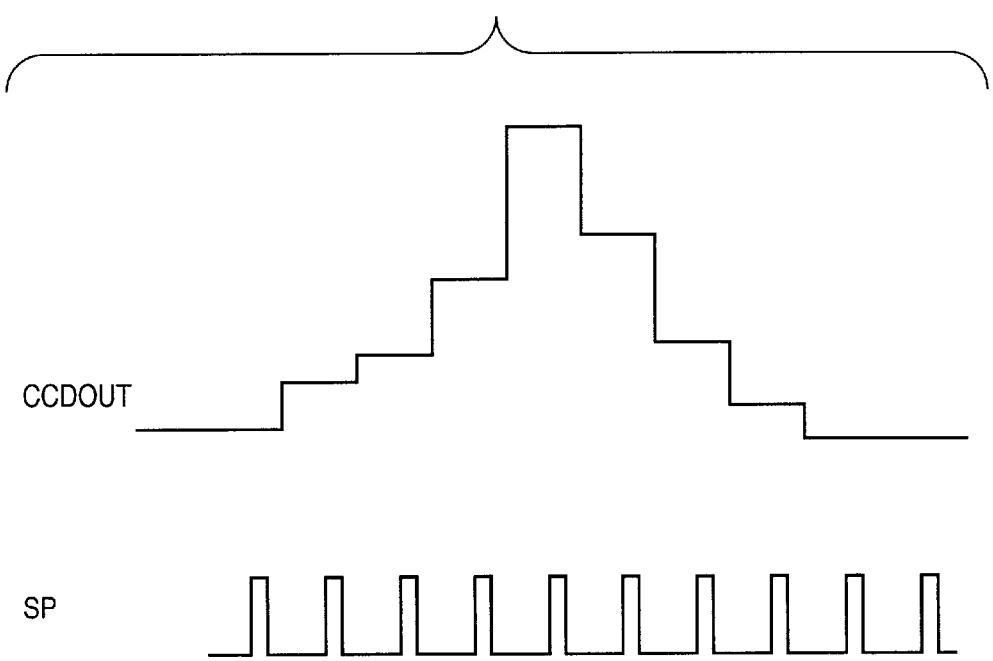
FIG. 22 is a timing chart of A/D conversion according to the second embodiment.

A/D conversion is executed at the timing shown in FIG. 22. That is, when the time axis is enlarged, the CCDOUT signal as the output from the ring CCD 26 is output as a voltage corresponding to the detection light level for each pixel, as shown in FIG. 22. This signal is A/D-converted for each pixel at the timing of a sampling pulse SP, and the sensor control section 31 stores that level in a memory or the like.

The above operation is performed for all elements of the ring CCD section 26 corresponding to all coordinate axes, and coordinate calculation to be described later is executed.

Light from the pointing device 4 to the coordinate detector varies in accordance with the consumption level of a power supply section (battery) 44 incorporated in the pointing device 4 and also varies depending on the posture of the pointing device 4. Especially, when the light diffusion of the screen 10 is small, the front luminance of a display image improves, though the variation in input light amount to the coordinate detector 1 due to the posture of the pointing device 4 becomes large. In the second embodiment, even in such a case, since the number of times of integration automatically follows up to always obtain a stable output signal, the coordinates can be stably detected.

As described above, since a high-frequency carrier is added to the blinking light, and timing control of integration operation is done by a demodulated signal at a predetermined period which is obtained by frequency-detecting the carrier, a convenient coordinate input apparatus capable of synchronizing the pointing device and image carrier section without using any wire can be implemented. In addition, since an integration control means for stopping the integration operation in accordance with the peak level in the difference signal from the integration section is arranged, a light spot image signal of almost predetermined level can be generated even when the light amount changes, and a stable high-resolution coordinate calculation result can always be obtained.

<Coordinate Value Calculation>

Coordinate calculation processing by the coordinate calculation section 32 will be described.

The output signal from the four linear sensors 20X$a$, 20X$b$, 20Y$a$, and 20Y$b$ obtained by the above-described method (difference signal from the amplifier 29) is converted into a digital signal by the A/D conversion section 31A in the sensor control section 31 and sent to the coordinate calculation section 32 to calculate the coordinate values. First, the coordinate values are obtained for the X- and Y-coordinate outputs in the respective directions. The calculation processing is common to the X- and Y-coordinates, and only calculation of the X-coordinate value will be described.

Figure 23:
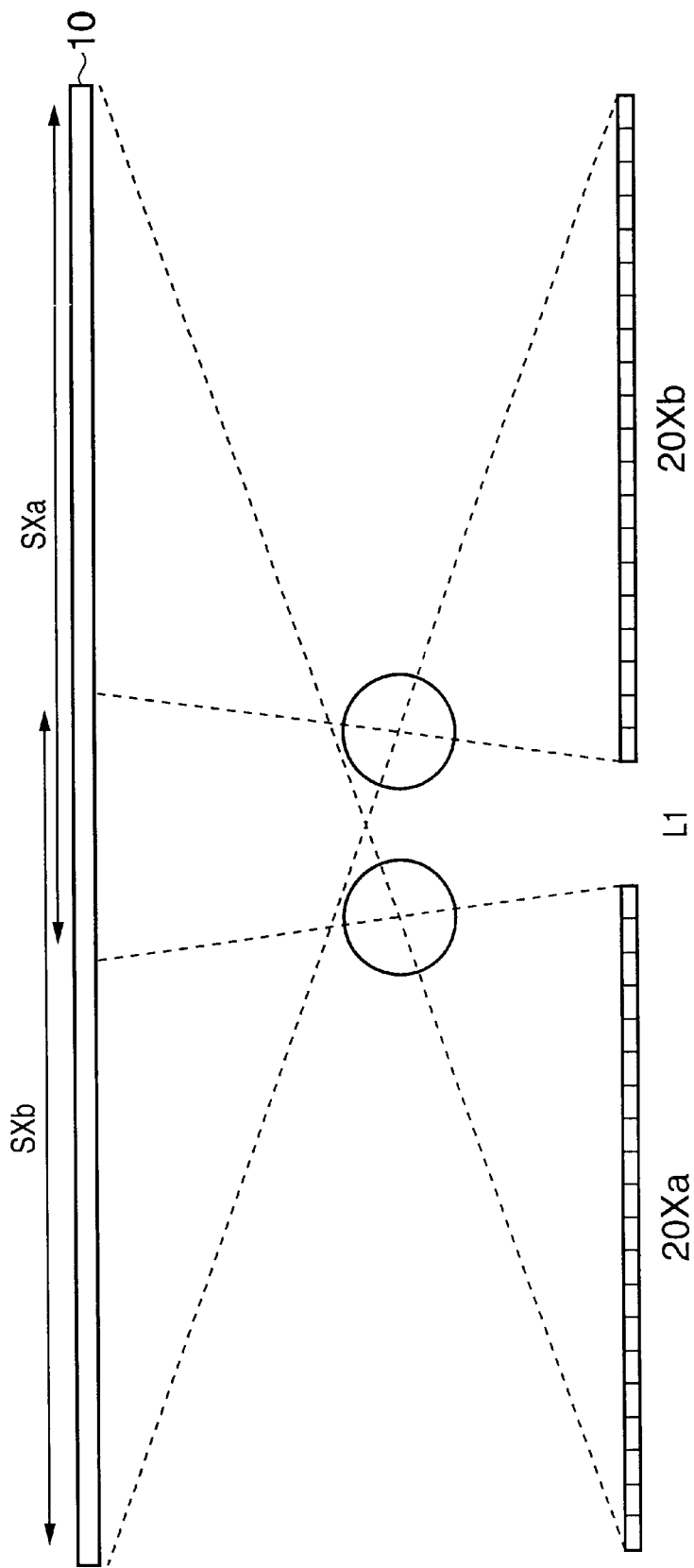
FIG. 23 is a view showing the structure of the linear sensors according to the second embodiment.

As shown in FIG. 23, the linear sensors 20X$a$ and 20X$b$ are constructed as half detection regions in the vertical direction of the screen 10. The detection regions overlap near the center.

When the light spot is in a region SXa of the screen 10, the linear sensor 20X$a$ detects the light. When the light spot is in a region SXb of the screen 10, the linear sensor 20X$b$ detects the light. In the overlap region, both sensors detect the light. The outputs from the linear sensors 20X$a$ and 20X$b$ at that time will be described with reference to FIG. 24.

Figure 24:
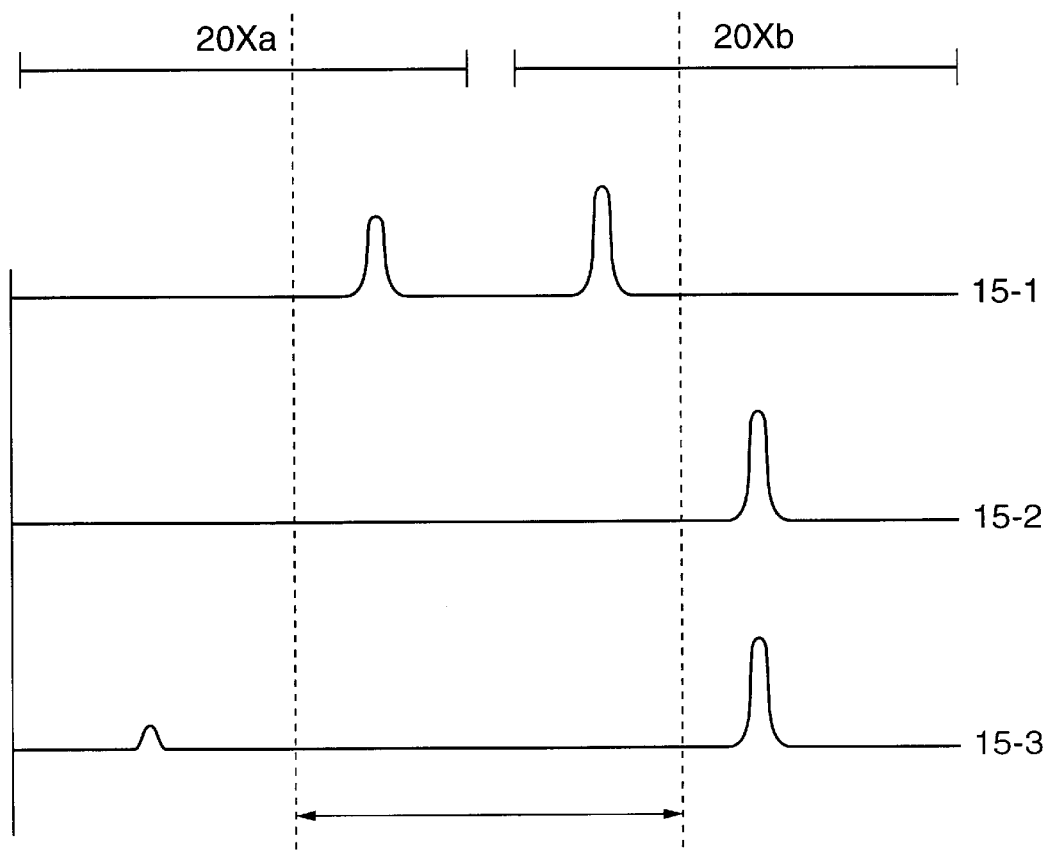
FIG. 24 is a view schematically showing the outputs of the linear sensors according to the second embodiment.

FIG. 24 is a view schematically showing the outputs of the linear sensors.

When the light spot is in the overlap portion at the center, both the linear sensors 20X$a$ and 20X$b$ output signals, as indicated by 15-1. When the light spot is in the region SXb, only the linear sensor 20X$b$ outputs a signal, as indicated by 15-2. Ideally, except the overlap portion, when one of the linear sensors outputs a signal, switching determination is done depending on whether the coordinate values from one linear sensor exceeds a reference point, and the coordinate values are connected.

However, an output is sometimes detected at a portion other than the actual light spot portion due to noise, leakage light, or disturbance light, as indicated by 15-3.

In this case, if determination is done on the basis of coordinate values from one linear sensor, a determination error occurs, and the cursor or the like is suddenly displayed at a wrong point on the display screen. During, e.g., drawing, an unnecessary line is drawn. To prevent this problem, in the present invention, the coordinate values are determined on the basis of the peak value of the obtained outputs from the linear sensors 20X$a$, 20X$b$, 20Y$a$, and 20Y$b$.

The process flow of coordinate calculation processing according to the second embodiment will be described next with reference to FIG. 25.

Figure 25:
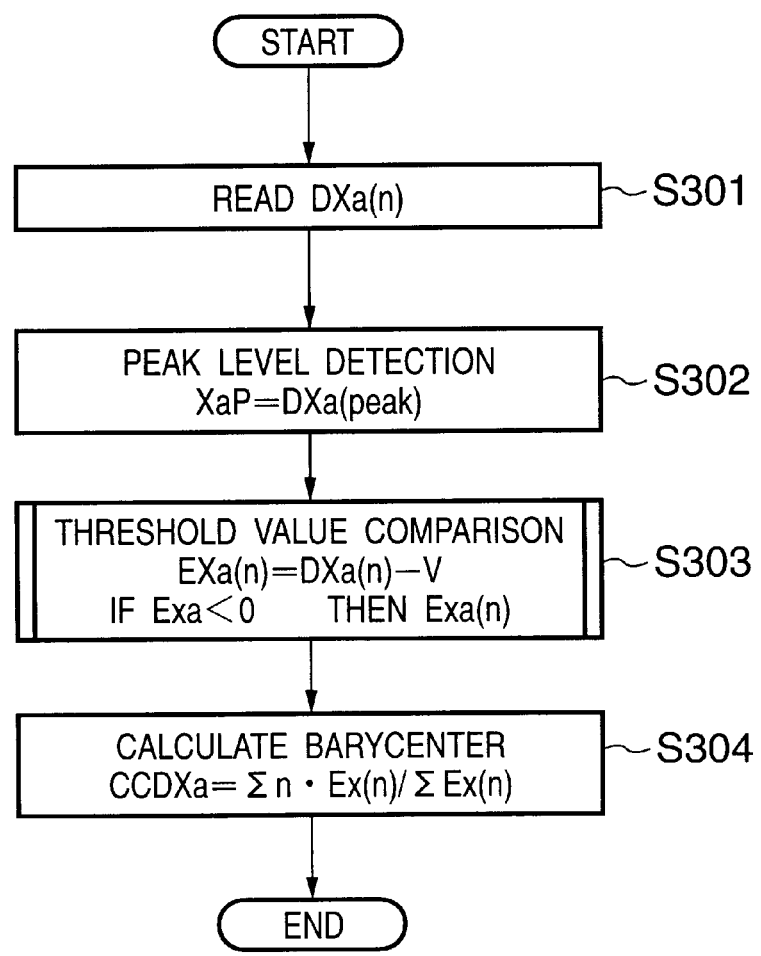
FIG. 25 is a flow chart showing the process flow of coordinate calculation processing according to the second embodiment.

FIG. 25 is a flow chart showing the process flow of coordinate calculation processing according to the second embodiment.

Outputs from the ring CCDs 26 of the linear sensors 20X$a$ and 20X$b$ are defined as DXa and DXb. Each of the values is an A/D-converted value, as described above, i.e., a voltage value corresponding to the photodetection amount for each pixel of the ring CCD 26. The peak level can be determined by the maximum value of each data.

Coordinates detected by the linear sensors 20X$a$ and 20X$b$ are defined as CCDXa and CCDXb.

In step S301, difference data DXa(n) (the number n of pixels=64 in the second embodiment) as the difference signal of each pixel at an arbitrary coordinate input point is read and stored in a buffer memory (not shown). In step S302, the peak level of this data is obtained and stored as Xap. In step S303, the value is compared with a preset threshold value V, and a data value Exa(n) equal to or larger than the threshold value is calculated. In step S304, the coordinate CCDXa on the linear sensor 20Xa is calculated using the data value Exa (n). In the second embodiment, the barycenter of the output data is calculated by the barycentric method. However, the calculation method is not limited to the above method, and a method of obtaining the peak value of the output data Exa(n) (by, e.g., the differential method) may also be used.

In a similar way, the coordinate CCDXb on the linear sensor 20Xb is also calculated.

These calculated coordinate values are coordinates corresponding to the pixels on the linear CCDs 26 of the linear sensors 20Xa and 20Xb. When these coordinate values are connected, they can be processed as coordinate values on one linear sensor 20Xa or 20Xb.

To do this, reference coordinates for connecting the coordinate values corresponding to the pixels on the linear CCDs 26 of the linear sensors 20Xa and 20Xb are defined.

The definition of the reference coordinates will be described with reference to FIG. 26.

Figure 26:
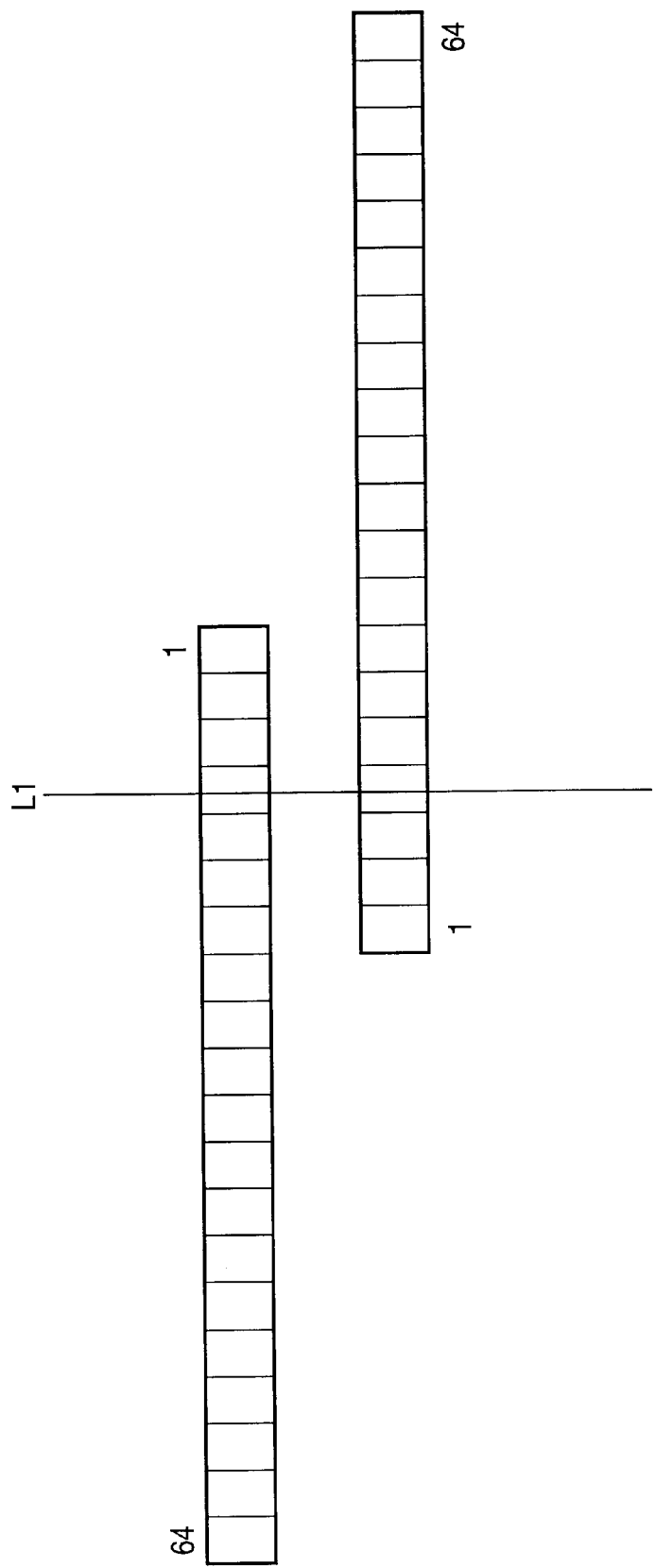
FIG. 26 is a view for explaining the definition of reference coordinates according to the second embodiment.

FIG. 26 is a view for explaining the definition of reference coordinates according to the second embodiment.

FIG. 26 shows a conceptual layout of the coordinates of the linear CCDs 26 of the linear sensors 20Xa and 20Xb. Since the detection regions of the linear sensors 20Xa and 20Xb have overlap portions, as described above, the coordinate positions overlap, as shown in FIG. 26.

At this time, reference points are defined in advance in a region where both the linear CCDs 26 of the linear sensors 20Xa and 20Xb can execute measurement. That is, a signal is input to the overlap portion on the screen 10, and the coordinates CCDXa and CCDXb (CCDXa_org, CCDXb_org) are read. These values are stored in a nonvolatile memory (not shown) such as an EEPROM as reference point data (reference coordinates). In normal use, the values are read out to calculate the coordinate values.

Processing of calculating a connected coordinate CCDX obtained by connecting the coordinate values corresponding to the pixels on the linear CCDs 26 of the linear sensors 20Xa and 20Xb using the reference point data will be described below with reference to FIG. 27.

Figure 27:
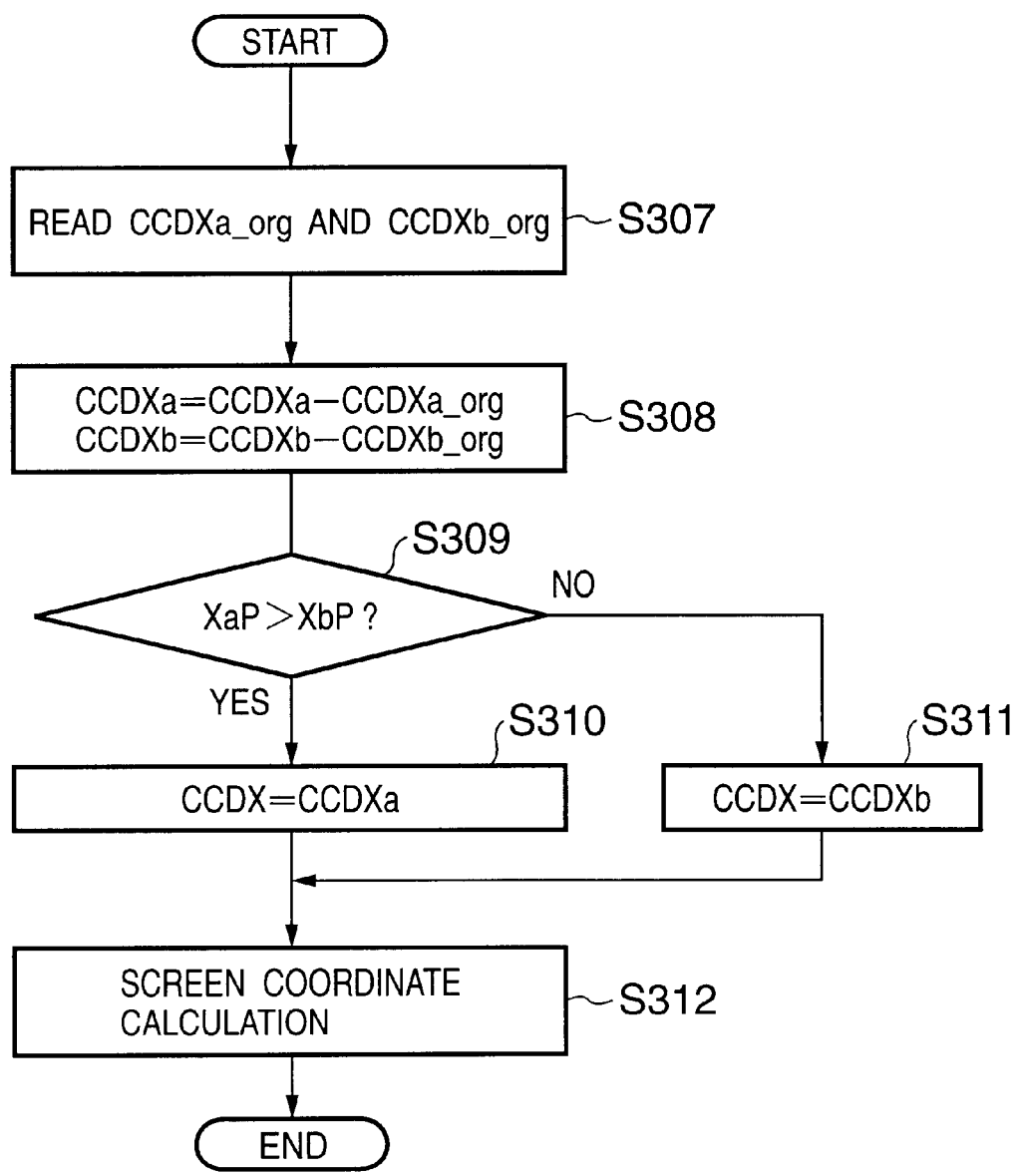
FIG. 27 is a flow chart showing the process flow of calculation processing of connected coordinates CCDX according to the second embodiment.

FIG. 27 is a flow chart showing the process flow of calculation processing of the connected coordinate CCDX according to the second embodiment.

In step S307, the reference point data (CCDXa_org, CCDXb_org) of the linear CCDs 26 of the linear sensors 20Xa and 20Xb are read out from the memory. In step S308, the difference between the reference point data and the values CCDXa and CCDXb calculated when input from the pointing device 4 is detected is calculated. The values are converted into coordinates on the linear CCDs whose origins are set at points on a line L1 near the center in FIG. 26.

In step S309, peak levels XaP and XbP of the linear sensors 20Xa and 20Xb, which are stored in advance, are compared with each other. Since a signal by disturbance light or the like is normally considerably smaller than a signal by a normal light spot, the signal having a larger peak value is employed as normal coordinates. In this way, the coordinate values of the two linear CCDs of the linear sensors 20Xa and 20Xb can be connected at the line L1.

More specifically, when the peak level XaP is higher than the peak level XbP (YES in step S309), the flow advances to step S310 to define CCDX=CCDXa, and then the flow advances to step S312. If the peak level XaP is lower than the peak level XbP (NO in step S309), the flow advances to step S311 to define CCDX=CCDXb, and then the flow advances to step S312.

In step S312, to make the coordinate values on the screen 10 match, screen coordinate conversion is executed to convert the coordinate value CCDX obtained by the above processing into the coordinate value X on the screen 10. This processing will be described later in detail.

Processing for the X-coordinate has been described above. The same processing as described above is executed for the Y-coordinate.

A data signal representing the coordinate values (X,Y) calculated by the above-described calculation processing is sent from the coordinate calculation section 32 to the communication control section 33. The communication control section 33 receives the data signal and a control signal from the control signal detection section 72. The data signal and control signal are converted into communication signals having a predetermined format and sent to an external display control unit. Thus, various operations of operating the cursor on the screen 10, selecting the menu, and inputting characters and line drawings can be performed.

<Setting of Reference Point>

To make CCD coordinate values match coordinate values on the screen 10, pieces of information including the magnification used to convert the CCD coordinate values into coordinate values on the screen 10 and the coordinate values of the origin must be determined in advance. For this purpose, the CCD coordinate values of a plurality of known coordinate positions (reference points) are acquired and stored in a nonvolatile memory or the like.

Figure 28:
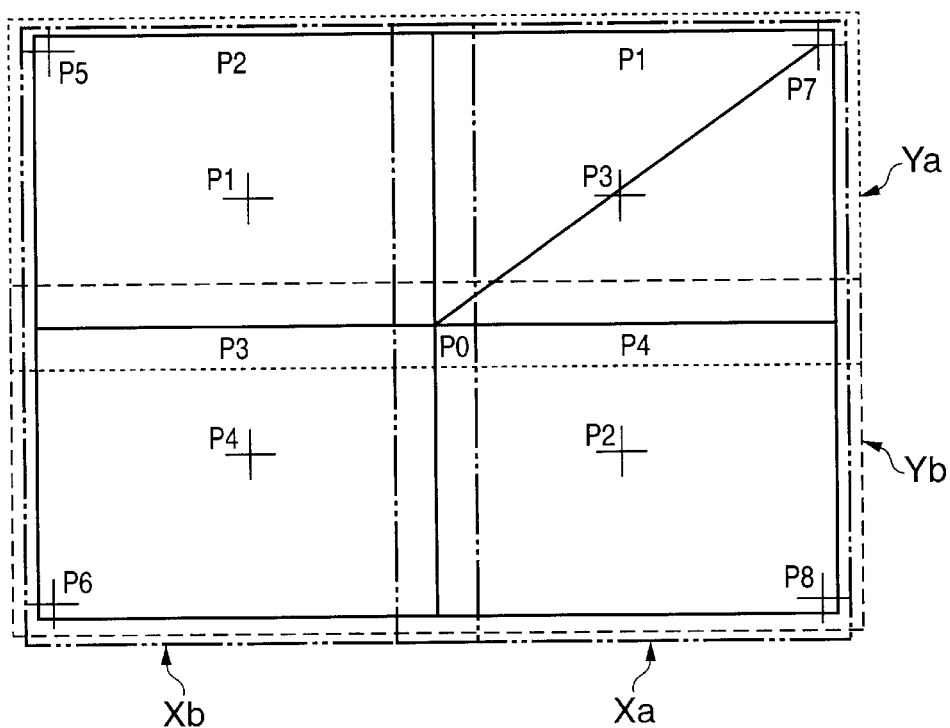
FIG. 28 is a view showing an example of coordinate positions of reference points according to the second embodiment.

FIG. 28 is a view showing an example of coordinate positions of reference points according to the second embodiment.

First, the origin as a reference is set. A signal is input to a position P0 in FIG. 28, and the CCD coordinate values at that time are stored. When the overlap portion of the linear sensors 20Xa, 20Xb, 20Ya, and 20Yb is set at that position, reference points used to connect the coordinate values on the linear sensors 20Xa, 20Xb, 20Ya, and 20Yb can be simultaneously input.

Next, input for determining the magnification is done at the origin. Actually, when information of a known point separated from the origin is present, the magnification can be calculated.

However, the magnification varies depending on the input position (reference point) due to aberration or variation in lens.

Figure 29:
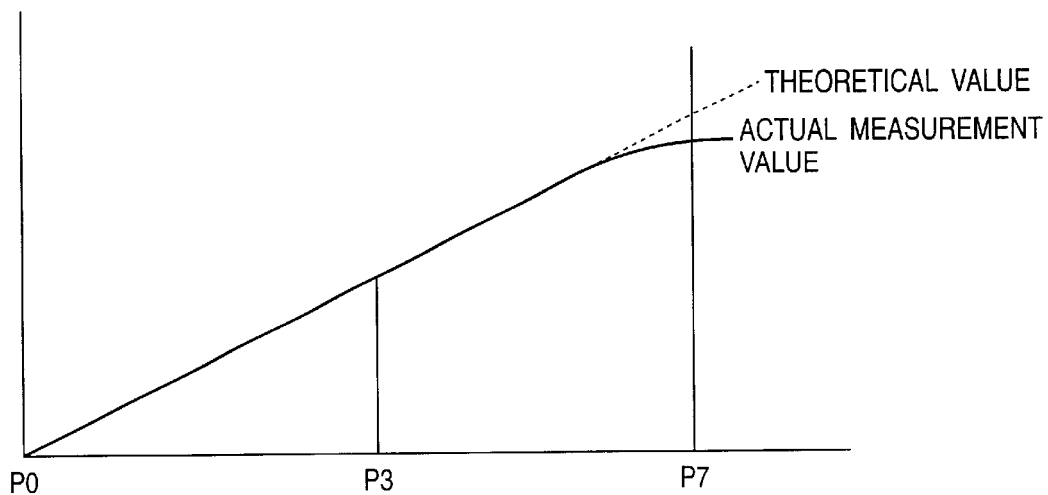
FIG. 29 is a graph showing a variation in magnification depending on the reference point according to the second embodiment.

FIG. 29 is a graph showing a variation in magnification depending on the reference point according to the second embodiment.

FIG. 29 shows the output of the CCD coordinate values of the reference point.

For example, the theoretical values of the CCD coordinate values between the reference points P0 and P7 in FIG. 28 are represented by a linear data sequence. The actual measurement values of the CCD coordinate values between the reference points P0 and P3 exhibit a linear output of CCD coordinate values, like the theoretical values, though the CCD coordinate values may lose the linearity near the reference point P7 and deviate from the linear data sequence of the theoretical values of the CCD coordinate values. In such a case, when data for the magnification is acquired at the reference point P7 and used for coordinate calculation, an error occurs as a whole.

To determine the magnification, CCD coordinate values of a reference point such as the point P3 where the actual measurement values of the CCD coordinate values, which are relatively similar to the theoretical values of the CCD coordinate values, can be obtained are used.

As described above, since connected coordinate values are obtained using the plurality of linear sensors 20X$a$, 20X$b$, 20Y$a$, and 20Y$b$, ranges where the linear sensors 20X$a$, 20X$b$, 20Y$a$, and 20Y$b$ are used are represented by regions Xa, Ya, Xb, and Yb in FIG. 28.

Since the cylindrical lenses 90X$a$, 90X$b$, 90Y$a$, and 90Y$b$ themselves are prepared in correspondence with the linear sensors 20X$a$, 20X$b$, 20Y$a$, and 20Y$b$, respectively, each of Xab and Yab has a variation.

Hence, a magnification corresponding to each of the linear sensors 20X$a$, 20X$b$, 20Y$a$, and 20Y$b$ must be obtained. To do this, outputs of the linear sensors 20X$a$, 20X$b$, 20Y$a$, and 20Y$b$ at reference points P1, P2, and P4, in addition to the reference point P3, are stored.

When the reference point P0 is present at the overlap portion, as shown in FIG. 28, the values of Xab and Yab are acquired at this point. The CCD data of the linear sensors 20X$a$, 20X$b$, 20Y$a$, and 20Y$b$ at that time are defined as P0X$a$, P0Y$a$, P0X$b$, and P0Y$b$. The reference point P0 is the origin. In this case, the coordinate values on the screen 10 is (X_P0,Y_P0)=(0,0).

For magnification determination, the CCD coordinates at the reference point P3 are defined as P3X$a$ and P3Y$a$, and the coordinate values on the screen 10 are defined as X_P3 and Y_P3. Magnifications $\alpha 3x$ and $\alpha 3y$ are given by $$\alpha 3x=(X\_P3-X\_P0)/(P3Xa-P0Xa) \quad (5)$$

$$\alpha 3y=(Y\_P3-Y\_P0)/(P3Ya-P0Ya) \quad (6)$$

As described above, when the coordinate value CCDX is multiplied by the magnification calculated for each reference point, the coordinate value on the screen 10 can be calculated.

In actual calculation, region determination is done on the basis of the obtained coordinate values CCDX and CCDY, and calculation is performed using magnifications $\alpha 1$, $\alpha 2$, $\alpha 3$, and $\alpha 4$ corresponding to the respective regions.

The magnification at the reference point with good linearity is determined in this way. Since the linearity degrades near the reference point P7 (peripheral portion of the screen 10), as shown in FIG. 28, an error occurs at the peripheral portion of the screen 10.

In an actual device, a margin portion is set outside the effective projection range of the screen 10. If this region is small, input may be limited at some portions, and input to the actual projection range may be impeded at those portions.

In a normal PC use environment, the menu bar or the like may be displayed by moving the cursor to the image peripheral portion. If an error occurs, the operation may be impeded.

To allow input to the peripheral portion of the screen 10 while keeping the magnification unchanged, CCD coordinate values from reference points P5 to P8 are acquired and stored, and used as data of fixed input points. A fixed input point here means a point that always outputs the coordinates of a preset point when input is done at that fixed input point.

That is, when the CCD coordinate values of the fixed input point are obtained, fixed coordinate values on the screen 10 are output independently of the magnification.

If only that point is forced to output fixed coordinate values, the coordinate values abruptly change to degrade the operability. For this reason, the coordinate values must be gradually changed from an appropriate point (e.g., the reference point P3 for the reference point P7).

For the coordinate system, the +X direction is set from the reference point P0 to the right side, and the +Y direction is set from the reference point P0 to the lower side. When coordinate values obtained by multiplying CCD coordinate values by the magnification are larger than X_P3 and smaller than Y_P3, coordinates are calculated while changing the weight by $$X=(CCDX*\alpha 3x)+(X-X\_P3)/(X\_P7-X\_P3)*((Y-Y\_P3)/(Y\_P3-Y\_P7))*(X\_P7-(p7x*\alpha 3x)) \quad (7)$$

$$Y=(CCDY*\alpha 3y)+(X-X\_P3)/(X\_P7-X\_P3)*((Y-Y\_P3)/(Y\_P3-Y\_P7))*(Y\_P7-(p7y*\alpha 3y)) \quad (8)$$

For the remaining regions as well, similar calculations are executed using combinations of the reference points P1 and P5, P4 and P6, and P2 and P8.

The above equations are mere examples, and equations of higher order may be used.

In the above way, CCD coordinate values that match the coordinate values on the screen 10 can be calculated. This corresponds to screen coordinate calculation processing in step S312 of FIG. 27.

Details of the processing in step S312 of FIG. 27 will be described with reference to FIG. 30.

Figure 30:
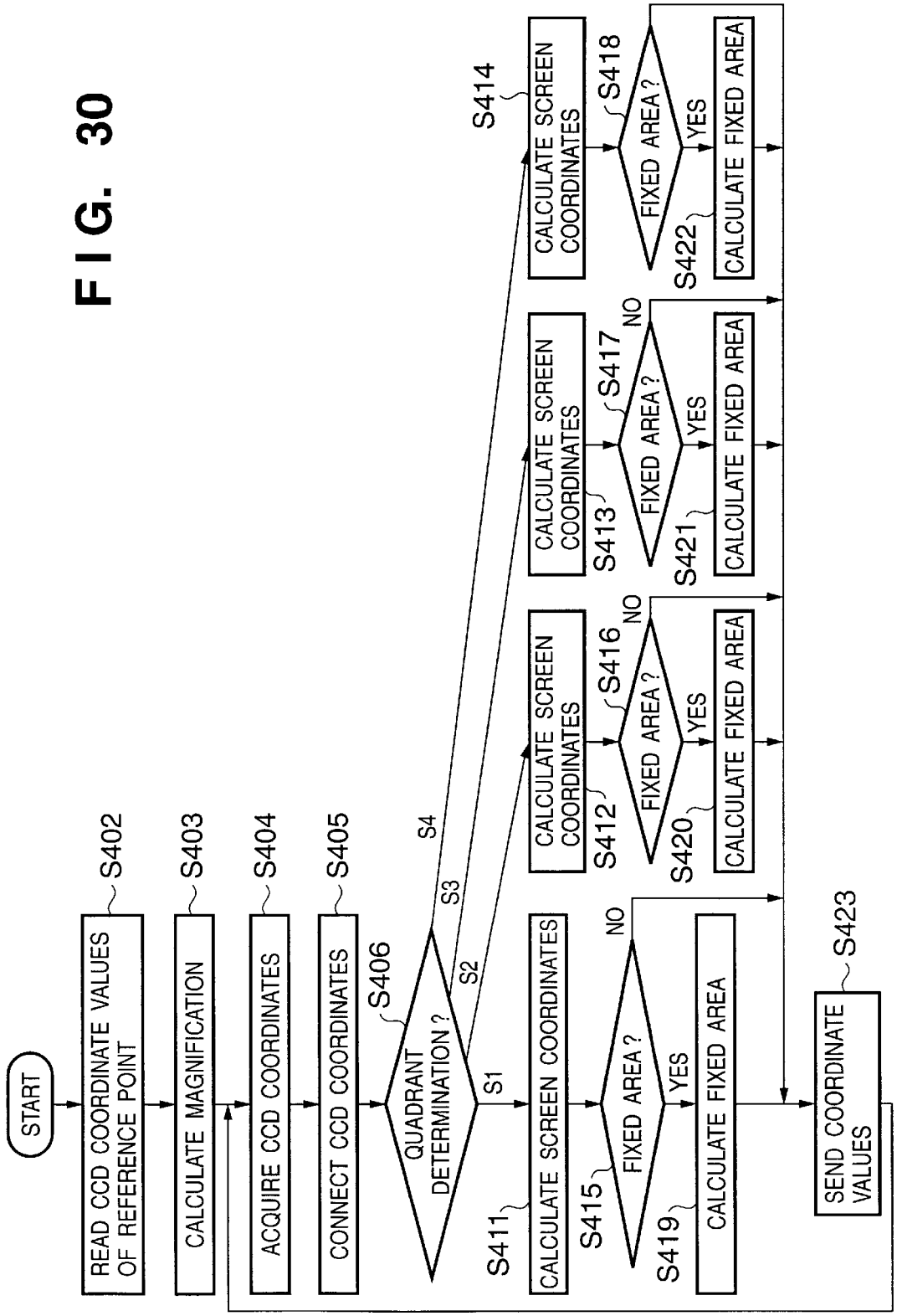
FIG. 30 is a flow chart showing details of processing in step S312 of the second embodiment.

FIG. 30 is a flow chart showing details of the processing in step S312 of the second embodiment.

In step S402, CCD coordinate values of the reference points P0 to P8 stored in the nonvolatile memory or the like are read out. Using the CCD coordinate values and known coordinate values corresponding to the reference points P0 to P8 on the screen 10, magnifications are calculated using equations (5) and (6).

In step S404, the input CCD coordinate values of each linear sensor are read. In step S405, the read CCD coordinate values are connected.

In step S406, which quadrant on the screen 10 has the coordinate values is determined on the basis of the connected CCD coordinate values. This determination is done by comparing the coordinate values with the coordinate values of the origin. For example, the first, second, third, and fourth quadrants are defined as S1, S2, S3, and S4, respectively, as shown in FIG. 28.

The processing branches to calculation for the determined quadrant.

For example, a case of the first quadrant S1 will be described. In step S411, the connected CCD coordinate values are multiplied by the magnification for the first quadrant S1, thereby calculating the screen coordinates. In step S415, it is determined whether the area is a fixed area where the calculated screen coordinates represent a fixed input point. For the first quadrant S1, this determination is done on the basis of the coordinate values of the reference point P3, as described above. For the remaining quadrants, determination is done in the same way as described above.

If it is determined in step S415 that the area is not a fixed area (NO in step S415), the flow advances to step S423 to output the calculated screen coordinates. If the area is a fixed area (YES in step S415), screen coordinates for the fixed area are calculated using equations (7) and (8). Then, the flow advances to step S423 to output the calculated screen coordinates. After sending the coordinates, the magnifications and the like are already calculated and stored in the memory. Hence, the flow returns to step S404.

The case of the first quadrant S1 has been described above. For the remaining quadrants, the same calculation method as described above can be employed except that the coordinate values of the reference point to be used are different.

In the above way, the CCD coordinate values of each known reference point are acquired and stored in the nonvolatile memory. Using the stored CCD coordinate values, the origin, magnification, and fixed input points are calculated, and the coordinates are calculated. Hence, a more accurate coordinate input apparatus can be provided.

To acquire the CCD coordinate values of a plurality of reference points, a device capable of inputting a signal to known input positions may be used, or the CCD coordinate values may be set on the screen at the time of shipment.

For example, when the coordinate values of a reference point on the screen 10 are transmitted to the communication control section 33, the driver on the host computer side displays a cursor at that position on the screen 10. When a signal is input to the cursor position, the CCD coordinate values of the reference point are obtained. When this processing is repeated while sequentially changing the coordinate values to be output, the CCD coordinate values of nine reference points can be input on the side of the externally connected device such as a host computer.

Figure 31:
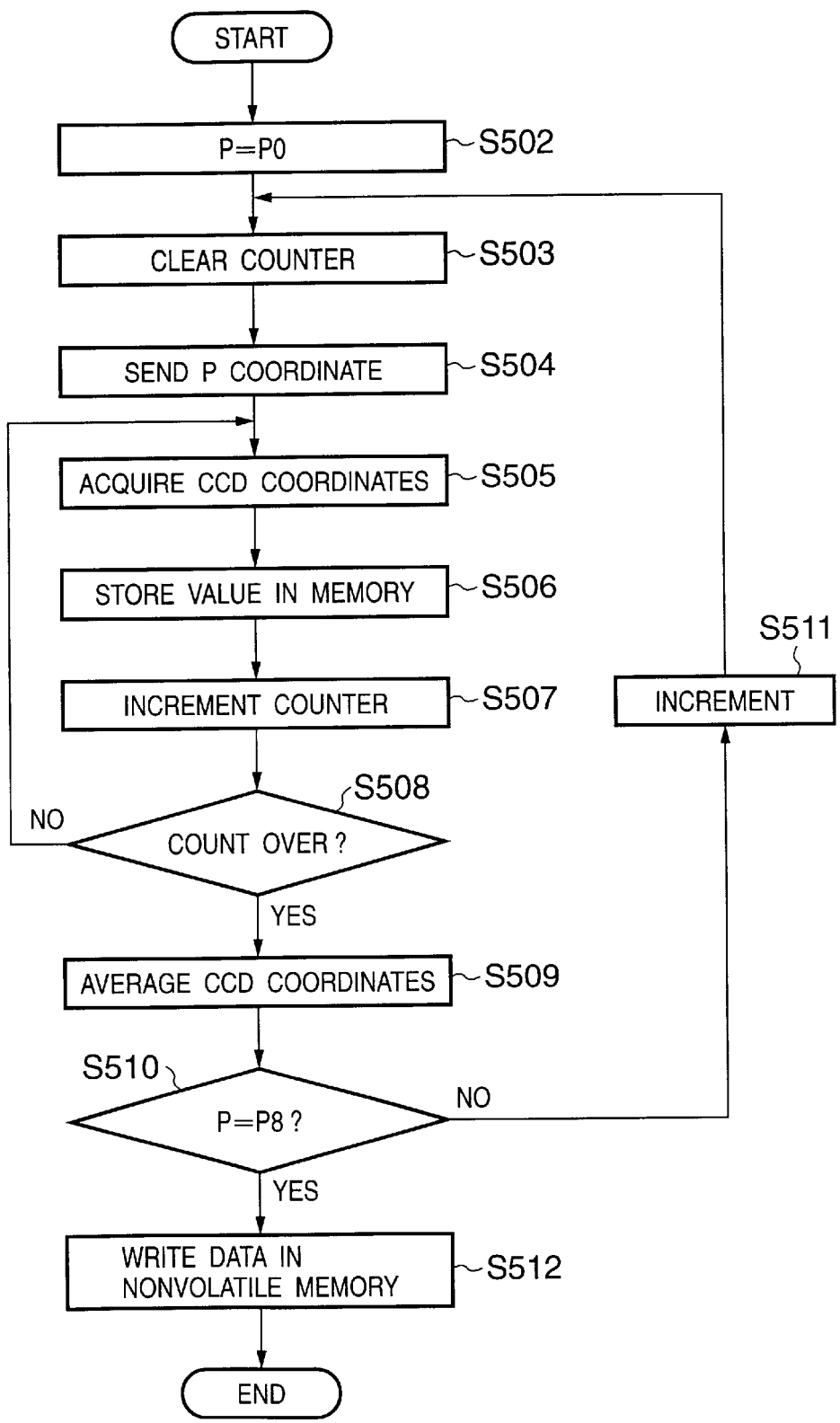
FIG. 31 is a flow chart showing processing of inputting the coordinate values of nine reference points in the second embodiment.

FIG. 31 is a flow chart showing processing of inputting the coordinate values of nine reference points in the second embodiment.

When a reference point setting mode is set, in step S502, the externally connected device sets the coordinate values of the reference point P0 on the screen 10 to a reference point Pn (n: 1, 2, ..., 8, 9) at which CCD coordinate values are to be acquired (for the sake of simplicity, no detailed description for each of the X- and Y-coordinates will be made, though both the X- and Y-coordinates are set).

In step S503, a counter for measuring the number of times of acquisition of CCD coordinate values of the reference point Pn is cleared. To more accurately acquire the CCD coordinate values of each reference point, CCD coordinate values of a single reference point are acquired a puerility of number of times, and the average value of the plurality of acquired CCD coordinate values is used as the CCD coordinate values of the reference point. The number of times of acquisition is determined on the basis of the required accuracy in accordance with the device state such as noise.

In step S504, the coordinate values of each reference point set in advance are output. In step S505, CCD coordinates corresponding to the reference points are acquired and stored in the memory. In step S507, the counter for the number of times of acquisition is incremented. In step S508, it is determined whether the coordinate values are acquired a predetermined number of times.

If the number of times of acquisition is smaller than the predetermined number of times (NO in step S508), the flow returns to step S505. If the number of times of acquisition has reached the predetermined number of times (YES in step S508), the flow advances to step S509 to calculate the average of the plurality of CCD coordinate values acquired for a single reference point. The average CCD coordinate values are stored in a memory prepared for each reference point.

It is determined in step S510 whether the point to be processed is the last reference point Pn. If the point to be processed is not the last reference point Pn (NO in step S510), the flow advances to step S511 to increment the reference point Pn to be processed, and the flow returns to step S503. If the point to be processed is the last reference point Pn (YES in step S510), the obtained CCD coordinate values of each reference point are stored in the nonvolatile memory 9 in step S512.

This operation may be executed every time the device is powered on but generally suffices at the time of shipment.

As described above, according to the second embodiment, an accurate coordinate input apparatus can be provided, which stores the CCD coordinate values of a plurality of reference points in the nonvolatile memory, calculates from these CCD coordinate values the origin, magnification, and fixed points used to obtain the final coordinate values on the screen 10, and calculates the coordinates.

The number of reference points in the present invention is not limited to the above example and is determined in accordance with the configuration of each system.

The number of reference points is not limited to nine and is determined in accordance with the system.

The object of the present invention is achieved even by supplying a storage medium which stores software program codes for implementing the functions of the above-described embodiments to a system or apparatus and causing the computer (or a CPU or MPU) of the system or apparatus to read out and execute the program codes stored in the storage medium.

In this case, the program codes read out from the storage medium implement the functions of the above-described embodiments by themselves, and the storage medium which stores the program codes constitutes the present invention.

As the storage medium for supplying the program codes, for example, a floppy disk, hard disk, optical disk, magnetooptical disk, CD-ROM, CD-R, magnetic tape, nonvolatile memory card, ROM, or the like can be used.

The functions of the above-described embodiments are implemented not only when the readout program codes are executed by the computer but also when the operating system (OS) running on the computer performs part or all of actual processing on the basis of the instructions of the program codes.

The functions of the above-described embodiments are also implemented when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

When the present invention is applied to the storage medium, it stores program codes corresponding to the above-described flow charts.

As has been described above, according to the present invention, a coordinate input apparatus which has a high accuracy and resolving power and excellent operability, and a control method and program therefor can be provided at low cost.

As many apparently widely different embodiments of the present invention can be made without departing from the spirit and scope thereof, it is to be understood that the invention is not limited to the specific embodiments thereof except as defined in the appended claims.

What is claimed is:

1. A coordinate input apparatus for generating coordinates corresponding a light irradiated from a pointing device, comprising:

detection means for detecting the light irradiated from the pointing device;

storage means for storing output information from said detection means for at least at three known positions including first to third positions of the light irradiated from the pointing device;

calculation means for calculating coordinate values corresponding to the light using two of the pieces of said output information at said first and said second positions, which are stored in said storage means; and correction means for correcting the coordinate values calculated by said calculation means to generate final coordinate values corresponding to the light using said output information at a said third position, only when said coordinate values calculated by said calculation means fall inside a predetermined region defined by the first to third positions.

2. The apparatus according to claim 1, wherein when said coordinate values calculated by said calculation means are (X',Y'), and said final coordinate values are (X,Y), X is a dependent function of X' and Y', and Y is a dependent function of X' and Y'.

3. The apparatus according to claim 1, further comprising determination means for determining on the basis of the result of the first calculation whether the second calculation is to be executed.

4. The apparatus according to claim 1, wherein the third position is at least one of four corners of a coordinate input effective area of the coordinate input screen.

5. The apparatus according to claim 1, wherein said detection means comprises an X-axis sensor in which photosensitive portions are linearly arrayed in an X-axis direction and a Y-axis sensor in which photosensitive portions are linearly arrayed in a Y-axis direction, an image of the light is formed on said X-axis sensor through a cylindrical lens having an axis in the Y axis direction, and the image of the light is formed on said Y-axis sensor through a cylindrical lens having an axis in the X-axis direction.

6. The apparatus according to claim 5, wherein the third position is set at a position in the coordinate input effective area, where an angle made by a light beam from an incident position on the cylindrical lens and a perpendicular to the photosensitive portions of said detection means is maximized.

7. A control method for a coordinate input apparatus for irradiating a coordinate input screen with light from a pointing device, and generating coordinates corresponding to the light, comprising:

the detection step of detecting the light irradiated on the coordinate input screen from the pointing device; and the calculation step of calculating coordinate values of the light irradiated on the coordinate input screen using at least two of pieces of output information at least at three known positions including first to third positions of the light irradiated from the pointing device in the detection step; and a correction step for correcting the coordinate values calculated by said calculation step to generate final coordinate values corresponding to the light using output information at a third position, when coordinate values calculated by said calculation step correspond to a predetermined region defined by the first to third positions.

8. The method according to claim 7, wherein when coordinate values as the result of the first calculation are (X',Y'), and coordinate values as a result of the second calculation are (X,Y), X is a dependent function of X' and Y', and Y is a dependent function of X' and Y'.

9. The method according to claim 7, further comprising the determination step of determining on the basis of the result of the first calculation whether the second calculation is to be executed.

10. The method according to claim 7, wherein the third position is at least one of four corners of a coordinate input effective area of the coordinate input screen.

11. The method according to claim 7, wherein a detection section for executing detection in the detection step comprises an X-axis sensor in which photosensitive portions are linearly arrayed in an X-axis direction and a Y-axis sensor in which photosensitive portions are linearly arrayed in a Y-axis direction, an image of the light is formed on the X-axis sensor through a cylindrical lens having an axis in the Y-axis direction, and the image of the light is formed on the Y-axis sensor through a cylindrical lens having an axis in the X-axis direction.

12. The method according to claim 11, wherein the third position is set at a position in the coordinate input effective area, where an angle made by a light beam from an incident position on the cylindrical lens and a perpendicular to the photosensitive portions of the detection step is maximized.

13. A program for causing a computer to control a coordinate input apparatus for irradiating a coordinate input screen with light from a pointing device, and generating coordinates corresponding to the light, comprising:

a program code of the detection step of detecting the light irradiated on the coordinate input screen from the pointing device; and a program code of the calculation step of calculating coordinate values of the light irradiated on the coordinate input screen using at least two of pieces of output information at least at three known positions of light irradiated from the pointing device, including first to third positions in the detection step; and a program code of a correction step for correcting coordinate values output by program code of the calculation step to generate final coordinate values corresponding to the light using output information at a third position, when coordinate values calculated by said program code of the calculations step correspond to a predetermined region defined by the first to third positions.

* * * * *